(12) United States Patent
Singh et al.

(10) Patent No.: US 12,068,621 B2
(45) Date of Patent: *Aug. 20, 2024

(54) FACILITATING CHARGE TRANSFER

(71) Applicant: EVQ TECHNOLOGIES PRIVATE LIMITED, Gurugram (IN)

(72) Inventors: Arjun Singh, Gurugram (IN); Mario Landau Holdsworth, San Franciso, CA (US); Martin Griffith, Bedford (CA); Gangadhara Gopi, Prakasam (IN)

(73) Assignee: EVQ TECHNOLOGIES PRIVATE LIMITED, Gurugram (IN)

( * ) Notice: Subject to any disclaimer, the term of this patent is extended or adjusted under 35 U.S.C. 154(b) by 209 days.

This patent is subject to a terminal disclaimer.

(21) Appl. No.: 17/664,276

(22) Filed: May 20, 2022

(65) Prior Publication Data

US 2022/0278536 A1 Sep. 1, 2022

Related U.S. Application Data

(63) Continuation of application No. 17/022,703, filed on Sep. 16, 2020, now Pat. No. 11,368,028.

(51) Int. Cl.
*H02J 7/00* (2006.01)
*B60L 53/62* (2019.01)
*B60L 53/66* (2019.01)
*B60L 53/67* (2019.01)
*H02J 7/14* (2006.01)

(52) U.S. Cl.
CPC .......... *H02J 7/00032* (2020.01); *B60L 53/62* (2019.02); *B60L 53/665* (2019.02); *B60L 53/67* (2019.02); *H02J 7/0048* (2020.01)

(58) Field of Classification Search
CPC ..... H02J 7/00032; H02J 7/0048; B60L 53/67; B60L 53/62; B60L 53/665
USPC ....................................................... 320/109
See application file for complete search history.

(56) References Cited

U.S. PATENT DOCUMENTS 9,566,868 B2 2/2017 Jammer
11,368,028 B2 * 6/2022 Singh .................... B60L 53/665

FOREIGN PATENT DOCUMENTS

| CN | 102722767 B | 6/2015 |
| CN | 103915869 B | 4/2016 |
| CN | 110040017 A | 7/2019 |

(Continued)

*Primary Examiner* — Alexis B Pacheco
(74) *Attorney, Agent, or Firm* — CHIP Law Group

(57) ABSTRACT

A method for facilitating charge transfer is provided. The method includes receiving, via an electronic device, a request to transfer charge stored in an energy storage device. The method includes determining a set of parameters of the energy storage device based on the received request. The set of parameters includes an amount of charge determined to be transferred from the energy storage device or a charge level desired to be achieved for the energy storage device. The method includes identifying charging systems available to receive and store charge corresponding to the set of parameters of the energy storage device. The method further includes allocating one of the identified charging systems to receive charge from the energy storage device and store the received amount of charge. The allocated charging system travels to a location of the energy storage device to receive the determined amount of charge from the energy storage device.

20 Claims, 11 Drawing Sheets

(56) References Cited

FOREIGN PATENT DOCUMENTS

| GB | 2542848 A | 4/2017 |
|---|---|---|
| WO | 2019210744 A1 | 11/2019 |

* cited by examiner

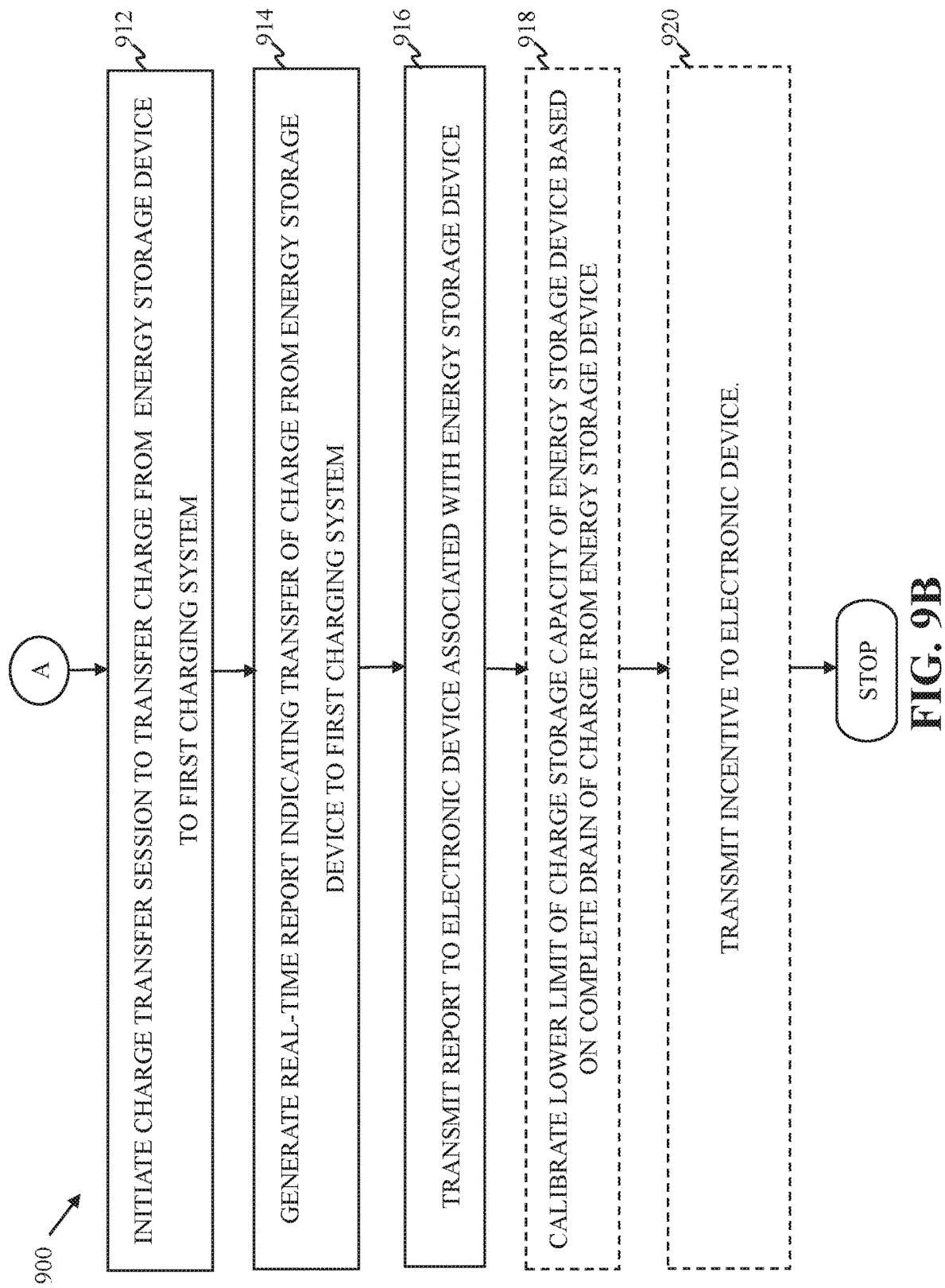

FACILITATING CHARGE TRANSFER

CROSS-RELATED APPLICATIONS

This patent application makes reference to, claims priority to, claims the benefit of, and is a Continuation-in-part Application of U.S. patent application Ser. No. 17/022,703, filed Sep. 16, 2020.

FIELD

Various embodiments of the disclosure relate generally to electric vehicles. More specifically, various embodiments of the disclosure relate to methods and systems for facilitating charge transfer from an energy storage device to one or more mobile charging systems.

BACKGROUND

With the advent of electric vehicles (EVs), fossil fuel-based vehicles are being replaced by EVs that use electric motors or traction motors for propulsion. An EV may include various batteries or battery packs that store and provide electric charge required to power the EV. Therefore, electric charge stored in such batteries is critical for the functioning of EV. However, there are often situations where the charge stored in the EVs goes unused due to various reasons within or outside human control, and ultimately the batteries drain without even being used.

In light of the foregoing, there exists a need for a technical and reliable solution that overcomes the abovementioned problems.

Limitations and disadvantages of conventional and traditional approaches will become apparent to one of skill in the art, through comparison of described systems with some aspects of the present disclosure, as set forth in the remainder of the present application and with reference to the drawings.

SUMMARY

Methods and systems for facilitating transfer of charge from an energy storage device to a mobile charging system are provided substantially as shown in and described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIGS. 9A-9B, collectively represent a flow chart that illustrates a method for facilitating transfer of charge from a node to a mobile charging system, in accordance with an exemplary embodiment of the present disclosure.

DETAILED DESCRIPTION

Figure 1:
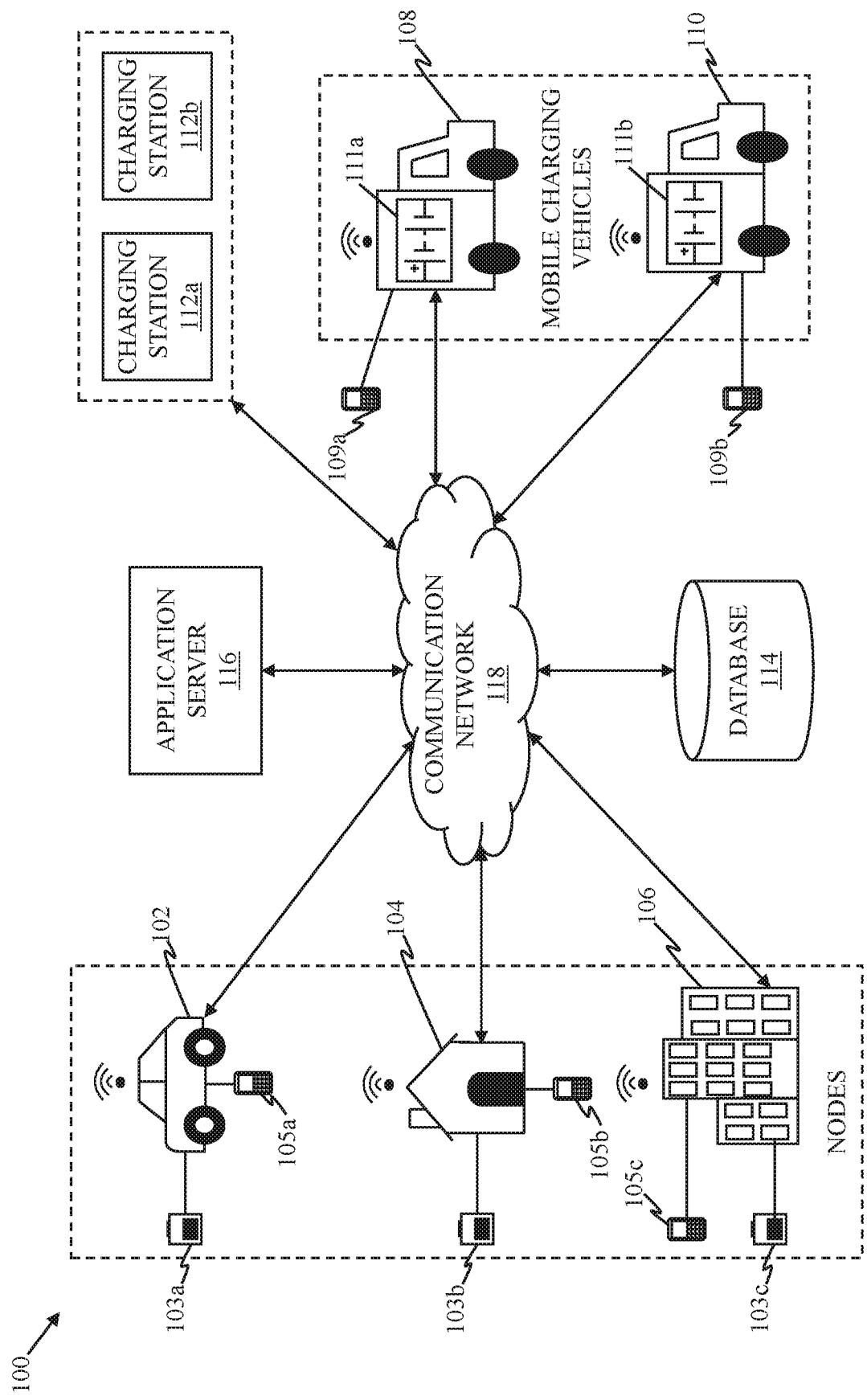
FIG. 1 is a block diagram that illustrates a system environment for facilitating transfer of charge from an energy storage device to a mobile charging system, in accordance with an exemplary embodiment of the present disclosure.

In an embodiment, methods and systems to facilitate charge transfer are described. The method includes receiving, by an application server, via an electronic device associated with an energy storage device, a request to transfer charge stored in the energy storage device. A set of parameters of the energy storage device is determined, by the application server, based on the received request. The set of parameters includes at least one of an amount of charge determined to be transferred from the energy storage device or a charge level desired to be achieved for the energy storage device. One or more mobile charging systems available to receive and store the charge corresponding to the set of parameters of the energy storage device are identified, by the application server. From the one or more mobile charging systems, a first mobile charging system is allocated, by the application server, to receive charge from the energy storage device and store the received charge. Subsequently, the first mobile charging system travels to a location of the energy storage device to receive the determined amount of charge from the energy storage device.

Various embodiments of the disclosure may be found in the disclosed systems and methods for facilitating transfer of charge from an energy storage device to a mobile charging system. Exemplary aspects of the disclosure provide methods for facilitating charge transfer from the energy storage device to the mobile charging system. The methods include various operations that are executed by a server (for example, an application server) to facilitate the transfer of charge from the energy storage device to the mobile charging system. The energy storage device (for example, a battery) may be included in an electric vehicle (EV), a building, or a complex. The server may be configured to receive a request from an electronic device, associated with the energy storage device, to transfer the charge stored in the energy storage device. In an embodiment, the request may be transmitted, via the electronic device, based on an input received by the electronic device from a user. In another embodiment, the request may be transmitted, via the electronic device, based on an input automatically triggered by the electronic device based on one or more predetermined parameters set by the user. In another embodiment, the server may receive usage data (for example, current usage data and historical usage data) of the energy storage device from at least one of the energy storage devices or the electronic device and behavioral data of the user from the electronic device. The server may forecast a period of inactivity of the energy storage device based on the received usage data. The server may transmit a recommendation, to the electronic device, to initiate the request to transfer the charge stored in the energy storage device based on the forecasted period of inactivity of the energy storage device being greater than a threshold inactivity period. In such an embodiment, the request may be transmitted, via the electronic device, based on the recommendation of the server. The request to transfer the charge may be indicative of at least one of: a current charge level of the energy storage device, a maximum charge transfer rate supported by the energy storage device, and a minimum charge transfer rate supported by the energy storage device.

The server may determine a set of parameters of the energy storage device in accordance with the received request. For example, the determined set of parameters may include at least one of an amount of charge determined to be transferred from the energy storage device or a charge level desired to be achieved for the energy storage device. The determined set of parameters may further include a turn-around time for achieving the desired charge level of the energy storage device.

Subsequently, the server may identify one or more mobile charging systems available to receive and store charge corresponding to the set of parameters of the energy storage device. The identified one or more mobile charging systems are available within a first geographical region of the energy storage device. A current location of each of the energy storage devices and the one or more mobile charging systems is obtained via a Global Positioning System (GPS). From the identified one or more mobile charging systems, the server may allocate a first mobile charging system to receive the determined amount of charge from the energy storage device. The allocated first mobile charging system may then travel to a location of the energy storage device to receive the determined amount of charge from the energy storage device. In an embodiment, the server may be configured to generate a report that indicates the transfer of charge from the energy storage device to the first mobile charging system in real-time and transmit the generated report to the electronic device for display on a display screen.

In another embodiment, the server may be configured to transmit incentives to the electronic device for successfully transferring the charge from the energy storage device to the first mobile charging system. In particular, incentives in form of a gift, a voucher, a discount coupon, reward points, or a credit note may be transmitted to the electronic device.

In another embodiment, the request to transfer the charge is received by the server based on at least one of: the energy storage device being inactive for more than a predetermined time duration, an incentivization option presented on the electronic device, a user preference to maintain a predetermined amount of charge in the energy storage device, or a health optimization criteria of the energy storage device.

Thus, the methods and systems of the disclosure provide a solution for facilitating transfer of charge from an energy storage device to a mobile charging system. The disclosed methods and systems allows a user or the electronic device associated with the energy storage device to request transfer of a predetermined amount of charge from the energy storage device. The disclosed method significantly reduces or eliminates the wastage of unused charge in the energy storage device (e.g., batteries) and improves the health and life of the energy storage device. Further, the methods disclosed herein allow management of the health status of the energy storage device by draining the extra charge from the energy storage device in accordance with the health optimization criteria of the energy storage device. Therefore, the disclosed method and system facilitate round the clock availability of transfer of charge from the energy storage device to the mobile charging system and significantly reduce a likelihood of wastage of the charge from the energy storage device due to inactivity of the energy storage device. The disclosed systems and methods, additionally allow an energy storage device to loan a predetermined amount of charge and take back the predetermined amount of charge at a later point of time as required by the user of the energy storage device. Generally, the charge drained during calibration or recalibration process of an energy storage device is wasted; however, the methods and systems described in the disclosure allow maximum utilization of the charge drained from the energy storage device during calibration or recalibration of the energy storage device.

FIG. 1 is a block diagram that illustrates a system environment for facilitating transfer of charge from an energy storage device to a mobile charging system, in accordance with an exemplary embodiment of the present disclosure. With reference to FIG. 1, a system environment 100 is shown that includes a plurality of nodes 102-106 associated with corresponding plurality of energy storage devices 103a-103c and corresponding plurality of electronic devices 105a-105c. The system environment 100 further includes a plurality of mobile charging systems 108 and 110 associated with corresponding plurality of driver devices 109a and 109b and corresponding charging devices 111a and 111b. The system environment 100 further includes a plurality of charging stations 112a and 112b, a database 114, an application server 116, and a communication network 118.

Examples of the communication network 118 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof. Examples of the communication network 118 may further include a Narrow Band-Internet of Things (NB-IoT) network, a 5G network, a 4G network, a long range (LoRa) wireless technology network, a ZigBee network, an IPv6 Low-power wireless Personal Area Network (6LowPAN), or the like. Various entities (such as the plurality of electronic devices 105a-105c, the plurality of driver devices 109a and 109b, the plurality of nodes 102-106, the plurality of mobile charging systems 108 and 110, the database 114, and the application server 116) in the system environment 100 may be coupled to the communication network 118 in accordance with various wired and wireless communication protocols, such as Transmission Control Protocol and Internet Protocol (TCP/IP), User Datagram Protocol (UDP), Long Term Evolution (LTE) communication protocols, or any combination thereof.

The plurality of nodes 102-106 (interchangeably referred to as "the nodes 102-106") are entities that are associated with the plurality of energy storage devices 103a-103c, respectively. Examples of the plurality of energy storage devices 103a-103c may include, but are not limited to, batteries, fuel cells, supercapacitors, and ultra-supercapacitors. The plurality of nodes 102-106 may include suitable logic, circuitry, and interfaces that may be configured to control and perform one or more operations based on electric charge derived from the plurality of energy storage devices 103a-103c, respectively. In an embodiment, each of the nodes 102-106 may be a commercial or residential building, a vehicle (such as an electric vehicle), a system, or any open/closed area having one or more electric components powered by an energy storage device. For the sake of brevity, the node 102 is shown to be an electric vehicle 102, the node 104 is shown to be a residential building 104, and the node 106 is shown to be a commercial building 106 (such as a hospital, an office, or the like).

The plurality of nodes 102-106 or the one or more electric components associated with the plurality of nodes 102-106 are powered by the corresponding plurality of energy storage devices 103a-103c. The plurality of energy storage devices 103a-103c may have different configurations, charge storage capacities, maximum charging rates, health optimization criteria, or the like. The plurality of energy storage devices 103a-103c may get drained due to use. Thus, the plurality of the energy storage devices 103a-103c may require periodic charging for functioning. In some embodiments, the plurality of energy storage devices 103a-103c may have stored charge which may get self-drained due to the plurality of energy storage devices 103a-103c not being used. In such a scenario, the plurality of energy storage devices 103a-103c may require draining of charge before the charge is wasted due to self-draining.

The plurality of energy storage devices 103a-103c may get self-drained during a period of inactivity or idleness. Further, when the plurality of energy storage devices 103a-103c that have charge stored therein undergo a period of inactivity or idleness beyond a threshold inactivity period, health (for example, charge storage capacity) of the plurality of the energy storage devices 103a-103c degrades. Therefore, a long period of inactivity degrades charge storing capacity of an energy storage device (e.g., the plurality of energy storage devices 103a-103c). In an embodiment, in order to avoid the wastage of charge in the plurality of energy storage devices 103a-103c or health degradation due to stored charge during the period of inactivity, transfer of charge from the plurality of energy storage devices 103a-103c to another battery operated device may be beneficial. In another embodiment, on request, transfer of charge from the plurality of energy storage devices 103a-103c may be performed, until the charge from the plurality of energy storage devices 103a-103c is completely drained, for calibration of a lower limit of the charge storage capacity of each of the plurality of energy storage devices 103a-103c.

The plurality of nodes 102-106 may be associated with the corresponding plurality of electronic devices 105a-105c. In one example, the plurality of nodes 102-106 may be capable of communicating with the corresponding plurality of electronic devices 105a-105c via a wired connection (such as an auxiliary cable, ethernet, hardware controlled area network (CAN) bus, or the like) or a wireless connection (such as Bluetooth, Zigbee, Wi-fi hotspot, or the like). Examples of the plurality of electronic devices 105a-105c may include cell phones, mobile phones, smartphones, laptops, tablets, phablets, or the like. In another example, the plurality of electronic devices 105a-105c may be associated with a building management system, a vehicle management system, or a battery management system.

For the sake of brevity, the plurality of nodes 102-106 in FIG. 1 is shown to be buildings and vehicles. However, in other embodiments, the plurality of nodes 102-106 may be any other mode of transport (such as, a motorboat, an airplane, and the like), an unmanned aerial vehicle such as a drone, or any battery operated system or device, without deviating from the scope of the disclosure.

Each electronic device 105a-105c may be configured to track real-time or near real-time location of the corresponding plurality of nodes 102-106. Each electronic device 105a-105c may be further configured to communicate the real-time or near real-time location of the corresponding plurality of nodes 102-106 to the application server 116. Each electronic device 105a-105c may be further configured to track a current energy level of the corresponding plurality of energy storage devices 103a-103c. The current energy level may refer to an amount of charge or electric charge available in the corresponding plurality of energy storage devices 103a-103c. Each electronic device 105a-105c may be further configured to communicate the electric charge level data indicative of the current energy level of the corresponding plurality of nodes 102-106 to the application server 116. Each electronic device 105a-105c may be configured to execute a service application hosted by the application server 116 such that the service application may serve as a gateway to the application server 116. The plurality of electronic devices 105a-105c may be configured to present a user interface of the executed service application, which enables the corresponding plurality of users to initiate requests for transfer of charge corresponding to the plurality of nodes 102-106. It will be apparent to a person of ordinary skill in the art that transfer of charge from a node is the same as transfer of charge from an energy storage device of the node.

The plurality of mobile charging systems 108 and 110 are movable entities (e.g., a vehicle, a cart, a movable charging terminal, or the like) that are equipped with corresponding charging devices 111a and 111b, such as a battery, a supercapacitor, a fuel cell, an ultra-supercapacitor, an inverter, an uninterruptible power supply (UPS), or the like. The plurality of mobile charging systems 108 and 110 may include suitable logic, circuitry, and interfaces that may be configured to perform one or more operations for transfer of charge from the plurality of energy storage devices 103a-103c or discharging the plurality of energy storage devices 103a-103c. In an embodiment, the plurality of mobile charging systems 108 and 110 may include one or more autonomous carriers (such as drones) that hold the charging devices 111a and 111b of the plurality of mobile charging systems 108 and 110. Such autonomous carriers may receive and store charge from the plurality of energy storage devices 103a-103c.

In an embodiment, the plurality of mobile charging systems 108 and 110 may include the corresponding charging devices 111a and 111b configured to receive electric charge drained from the plurality of energy storage devices 103a-103c. The electric charge stored in the plurality of energy storage devices 103a-103c may often get self-drained due to inactivity of the energy storage devices 103a-103c beyond a threshold inactivity period, leading to dissipation of the stored charge without being effectively used. In such a scenario, to effectively use the charge stored in the plurality of energy storage devices 103a-103c, the charge from the plurality of energy storage devices 103a-103c may be transferred to the charging devices 111a and 111b of the mobile charging systems 108 and 110, respectively. In an embodiment, the mobile charging systems 108 and 110 may be EVs associated with respective charging devices 111a and 111b.

In an embodiment, each of the plurality of mobile charging systems 108 and 110 may be recharged at any of the plurality of charging stations 112a and 112b. In another embodiment, each of the plurality of mobile charging systems 108 and 110 may be recharged by transfer of charge from the plurality of energy storage devices 103a-103c. In such a scenario, each of the plurality of mobile charging systems 108 and 110 may not require recharging at the plurality of charging stations 112a and 112b. For example, the mobile charging system 108 may accept a request to receive charge from the node 102, and subsequent to accepting the request, the mobile charging system 108 may travel to a location of the node 102 to receive the determined amount of charge from the energy storage device 103a. In an embodiment, the charging devices 111a and 111b of the plurality of mobile charging systems 108 and 110 may be detachable and replaceable.

In an embodiment, the plurality of mobile charging systems 108 and 110 may be driven by a corresponding plurality of drivers. The plurality of drivers may have a corresponding plurality of driver devices 109a and 109b, which may enable the plurality of drivers to accept or reject various requests received from the plurality of nodes 102-106. In another embodiment, the plurality of mobile charging systems 108 and 110 may be semi-automated and may require a little or no intervention from the corresponding drivers. In another embodiment, the plurality of mobile charging systems 108 and 110 may be autonomous vehicles and do not require any driver for providing driving assistance.

In an embodiment, each of the plurality of mobile charging systems 108 and 110 may be capable of receiving charge from only one energy storage device at a time. In another embodiment, each of the plurality of mobile charging systems 108 and 110 may be capable of receiving charge from multiple energy storage devices concurrently.

In an embodiment, each of the plurality of mobile charging systems 108 and 110 may include a rolling platform, a pushcart, a hand cart, a forklift, a truck or trailer, a charge storage equipment (i.e., the charging device 111a or 111b), an energy storage device charger, one or more connectors for receiving power, one or more connectors (i.e., hardware for charge transfer) for receiving charge from the plurality of nodes 102-106. In one embodiment, the plurality of mobile charging systems 108 and 110 may include a telematics device or an on-board diagnostics (OBD) device that may be configured to communicate with the application server 116 or the corresponding plurality of driver devices 109a and 109b.

In an embodiment, the plurality of mobile charging systems 108 and 110 may be associated with a fleet manager. The fleet manager may be a service provider that has deployed the plurality of mobile charging systems 108 and 110 to provide an on-demand transfer of charge from the plurality of nodes 102-106. The transfer of charge service may be requested by the users associated with the plurality of nodes 102-106 by initiating requests via the service application. The requests may refer to demands for transferring charge from one or more of the plurality of nodes 102-106 to the one or more mobile charging systems 108 and 110.

The plurality of driver devices 109a and 109b may be cell-phones, mobile phones, smartphones, laptops, tablets, phablets, vehicle head unit, or the like. Each driver device 109a and 109b may be equipped with a Global Positioning System (GPS) sensor that tracks or monitors a real-time or near real-time location of the corresponding plurality of mobile charging systems 108 and 110. Each driver device 109a and 109b may be further configured to communicate location data of the corresponding plurality of mobile charging systems 108 and 110 to the application server 116. Each driver device 109a and 109b may be further configured to track or monitor a current state of charge of the corresponding plurality of mobile charging systems 108 and 110 and communicate state of charge data of the corresponding plurality of mobile charging systems 108 and 110 to the application server 116. The state of charge (SOC) data refers to an amount of charge that is available with the corresponding plurality of mobile charging systems 108 and 110. For example, each driver device 109a and 109b may be capable of coupling (wirelessly and/or wired connection) with the telematics device or the OBD device of the corresponding mobile charging systems 108 and 110 for receiving the state of charge data and location data. In another embodiment, the telematics device or the OBD device of the plurality of mobile charging systems 108 and 110 may communicate the state of charge data, the location data, or the like directly to the application server 116.

Each driver device 109a and 109b may be further configured to execute the service application that is hosted by the application server 116. The plurality of driver devices 109a and 109b may be configured to present a user interface of the executed service application, which enables the corresponding plurality of drivers to accept or reject the charging requests of the plurality of nodes 102-106.

The plurality of charging stations 112a and 112b may include suitable logic, circuitry, and interfaces that may be configured to perform one or more operations for charging electric components that are configured to store electric charge. Each charging station 112a and 112b is a stationary terminal that is present at a fixed location and has one or more mobile charging ports to which the plurality of mobile charging systems 108 and 110 connect for charging. Each of the plurality of charging stations 112a and 112b may correspond to a location or an outlet where the plurality of mobile charging systems 108 and 110 may charge the corresponding charging devices 111a and 111b. In an embodiment, the plurality of charging stations 112a and 112b may be direct current (DC) fast charging stations, level 1 charging stations, level 2 charging stations, or may provide an output from a power generation source generating alternating current (AC) or DC. In an embodiment, the charging devices 111a and 111b of the plurality of mobile charging systems 108 and 110 may be detached and replaced at the plurality of charging stations 112a and 112b. For example, the plurality of charging stations 112a and 112b may have one or more spare charging devices that are already charged. These charged charging devices may be used to replace the drained charging devices of the plurality of mobile charging systems 108 and 110 or the plurality of nodes 102-106 when required.

In one example, the plurality of charging stations 112a and 112b may be associated with the fleet manager. In another embodiment, the plurality of charging stations 112a and 112b may be a third-party service that provides charging facility to the plurality of mobile charging systems 108 and 110 or the plurality of nodes 102-106.

The database 114 may include suitable logic, circuitry, interfaces, and/or code, executable by the circuitry that may be configured to perform one or more operations for storing data associated with the plurality of nodes 102-106, the plurality of mobile charging systems 108 and 110, and the plurality of charging stations 112a and 112b. For example, the database 114 may store user preference data associated with the plurality of nodes 102-106, behavioral data of the user associated with the plurality of nodes 102-106, data associated with health optimization criteria of the plurality of energy storage devices 103a-103c, data associated with desired charge level in the plurality of energy storage devices 103a-103c, state of charge data associated with each of the plurality of mobile charging systems 108 and 110, health optimization criteria of each of the plurality of mobile charging systems 108 and 110, and availability status of each of the plurality of charging stations 112a and 112b, or the like. Examples of the database 114 may include a cloud-based database, a discharging capacity of the energy storage device, a discharging rate of the energy storage device, a local database, a distributed database, a database management system (DBMS), or the like.

Although the database 114 is shown as a standalone entity in FIG. 1, in other embodiments, the database 114 may be integrated with the application server 116 without deviating from the scope of the disclosure.

The application server 116 may include suitable logic, circuitry, interfaces, and/or code, executable by the circuitry that may be configured to perform one or more operations for facilitating charging and discharging of the plurality of nodes 102-106 by the plurality of mobile charging systems 108 and 110. The application server 116 may be configured to communicate with the database 114, the plurality of nodes 102-106, the plurality of electronic devices 105a-105c, the plurality of mobile charging systems 108 and 110, the plurality of driver devices 109a and 109b, and the plurality of charging stations 112a and 112b via the communication network 118. Examples of the application server 116 may include a cloud-based server, a local server, a group of centralized servers, a group of distributed servers, or the like. Various components of the application server 116 are described in detail in conjunction with FIG. 2.

The application server 116 may be configured to receive state of charge and location data from each of the plurality of mobile charging systems 108 and 110 in real-time or near real-time or periodically (for example, after 30 seconds, 60 seconds, 90 seconds, or the like). The state of charge data is indicative of a state of charge of the charging devices 111a and 111b of each of the plurality of mobile charging systems 108 and 110. The application server 116 may be configured to store the received state of charge data and the location data in the database 114. The application server 116 may be further configured to receive energy level data of each of the plurality of nodes 102-106 from the corresponding plurality of electronic devices 105a-105c in real-time, near real-time, or periodically. The energy level data may indicate a current energy level of each of the plurality of energy storage devices 103a-103c. The application server 116 may be configured to receive requests from electronic devices (for example, the plurality of electronic devices 105a-105c) for transfer of charge from nodes (such as the plurality of nodes 102-106 or any other node). For the sake of brevity, the other operations performed by the application server 116 are described with respect to the node 102.

In operation, the application server 116 may be configured to receive a request from the electronic device (for example, the electronic device 105a) associated with the node 102 for transfer of charge from the energy storage device 103a. The request may be indicative of the current energy level (e.g., remaining electric charge in the energy storage device 103a) of the node 102. The request to transfer the charge may further be indicative of at least one or more of: a charge level desired to be achieved for the energy storage device 103a, a maximum charge transfer rate supported by the energy storage device 103a, and a minimum charge transfer rate supported by the energy storage device 10.

In an embodiment, the request to transfer the charge is transmitted by the electronic device 105a, to the application server 116, based on an input received by the electronic device 105a from a user of the electronic device 105a. In another embodiment, the request to transfer the charge may be automatically transmitted by the electronic device 105a based on detection of a predetermined parameters set by the user being true. For example, the predetermined parameter may include "the EV (associated with electronic device 105a) will not be used for at least 5 days or the energy storage device 103a has a 5 Kilowatt Hour (kWh) of energy (e.g., charge) above a desired threshold". In a scenario, where the electronic device 105a detects the predetermined parameter is satisfied, the request to transfer the charge is automatically transmitted by the electronic device 105a to the application server 116. It will be apparent to a person of ordinary skill in the art that the charge of the energy storage device is the same as the energy of the energy storage device.

In an embodiment, the desired charge level of an energy storage device may be an amount of electric charge that should be maintained in the energy storage device based on a preference of the user associated with the energy storage device 103a or a state of charge of the energy storage device 103a required to maintain good health and performance of the battery as provided by a manufacturer of the energy storage device 103a.

In an embodiment, the maximum charge transfer rate supported by the energy storage device 103a may be a maximum amount of charge that can be drained from the energy storage device 103a per unit time based on the configuration of the energy storage device 103a. In an example, the maximum charge transfer rate of the energy storage device 103a may be 1C (C-rate), 2C, or 0.5C as provided in manufactures' declaration of the energy storage device 103a.

In an embodiment, the minimum charge transfer rate supported by the energy storage device 103a may be a minimum amount of charge that can be drained from the energy storage device 103a per unit time based on the configuration of the energy storage device 103a. In an example, the minimum charge transfer rate of the energy storage device 103a may be 0.1C or 0.05C as provided in manufactures' declaration of the energy storage device 103.

Further, the application server 116 may be further configured to determine a set of parameters for the energy storage device 103a based on the received request. The set of parameters may include one or more constraints for draining the energy storage device 103a, and the application server 116 may determine the set of parameters based on the information included in the received request. In an embodiment, the set of parameters may include an amount of charge determined or required to be drained from the energy storage device 103a. In another embodiment, the set of parameters may further include a turn-around time to drain the determined amount of charge from the energy storage device 103a. For example, the user of the node 102 may be leaving for a long holiday in 2 hours after the request for charge transfer has been initiated from the electronic device 105a. In such a scenario, the turn-around time to drain the determined amount of charge from the energy storage device 103a should not exceed 2 hours.

Furthermore, the application server 116 may identify one or more mobile charging systems of the plurality of mobile charging systems 108 and 110 available to receive and store charge corresponding to the set of parameters of the energy storage device 103a. The identified one or more mobile charging systems 108 and 110 should be available within a first geographical region of the energy storage device 103a. The identified one or more mobile charging systems 108 and 110 may be ranked based on an amount of charge that may be received and stored and distance of the identified mobile charging systems 108 and 110 from the energy storage device 103a. The first geographical region may be 1 kilometer (Km), 2 km, 2.5 km, or the like from the energy storage device 103a.

The application server 116 may be configured to render a user interface on a display of the electronic device 105a to present the plurality of mobile charging systems 108 and 110 to the user of the electronic device 105a based on the rank. The application server 116 may be further configured to allocate, from the identified one or more mobile charging systems 108 and 110, a first mobile charging system (e.g., the mobile charging system 108), to receive and store charge from the energy storage device 103a of the node 102. In an embodiment, the application server 116 may allocate the first mobile charging system (e.g., the mobile charging system 108) based on the ranking of the identified plurality of mobile charging systems 108 and 110. For example, the application server 116 may allocate the highest ranked mobile charging system to the node 102. In another embodiment, the application server 116 may allocate the first mobile charging system 108 based on the user preference of the user associated with the electronic device 105a. The user preference may include a selection of the first mobile charging system 108 by the user from the ranked plurality of mobile charging systems 108 and 110 displayed on the electronic device 105a. For example, the user preference may include a selection of a known first mobile charging system (e.g., the mobile charging system 108) by the user to whom a predetermined amount of charge may be loaned from the energy storage device 103a such that the predetermined amount of charge or a part of the predetermined charge may be taken back at a later point of time as required by the user.

The application server 116 may be further configured to communicate an allocation notification to the allocated first mobile charging system 108. The first mobile charging system 108 may communicate, to the application server 116, an allocation confirmation based on its availability to reach the second location to receive charge from the energy storage device 103a.

In an embodiment, the application server 116 may be further configured to communicate a confirmation notification to the electronic device 105a to indicate the allocation of the first mobile charging system 108 to receive charge from the energy storage device 103a. The confirmation notification indicates successful allocation of the first mobile charging system 108 to receive charge from the energy storage device 103a. The confirmation notification may include real-time location tracking information of the first mobile charging system 108.

Further, based on the allocation, the first mobile charging system 108 travels from a first location (e.g., the current location of the first mobile charging system 108) to reach a second location of the node 102 to receive charge from the energy storage device 103a. The first location may be a geographical location of the first mobile charging system 108, a landmark in vicinity of the first mobile charging system 108, or the like. The second location may be a geographical location of the node 102, a landmark in vicinity of the node 102, a predefined location, a building name, a street name, or the like.

Upon travel of the first mobile charging system 108 to the second location and initiation of transfer of energy from the energy storage device 103a, the application server 116 may be further configured to display, via the user interface on the electronic device 105a while the energy storage device 103a is being drained by the first mobile charging system 108, a real-time energy level of the energy storage device 103a, a unit of charge transferred from the energy storage device 103a to the first mobile charging system 108, an estimated cost in lieu of the transferred charge, and a remaining time to transfer the desired amount of charge from the energy storage device 103a. The desired charge level may be the charge level that should remain after the determined amount of electric charge is transferred from the energy storage device 103a.

It will be apparent to a person of ordinary skill in the art that the application server 116 may perform aforementioned operations for facilitating transfer of charge from the energy storage devices 103b and 103c of other nodes 104 and 106, respectively, without deviating from the scope of the disclosure. Since the application server 116 may receive or initiate multiple requests at the same time, the application server 116 may be configured to optimally allocate resources to ensure better resource utilization and smoother user experience. It will also be apparent to a person of ordinary skill in the art that in some embodiments the mobile charging system 110 may act as a node and may request to transfer the charge stored in its charging device 111a to another mobile charging system.

Figure 2:
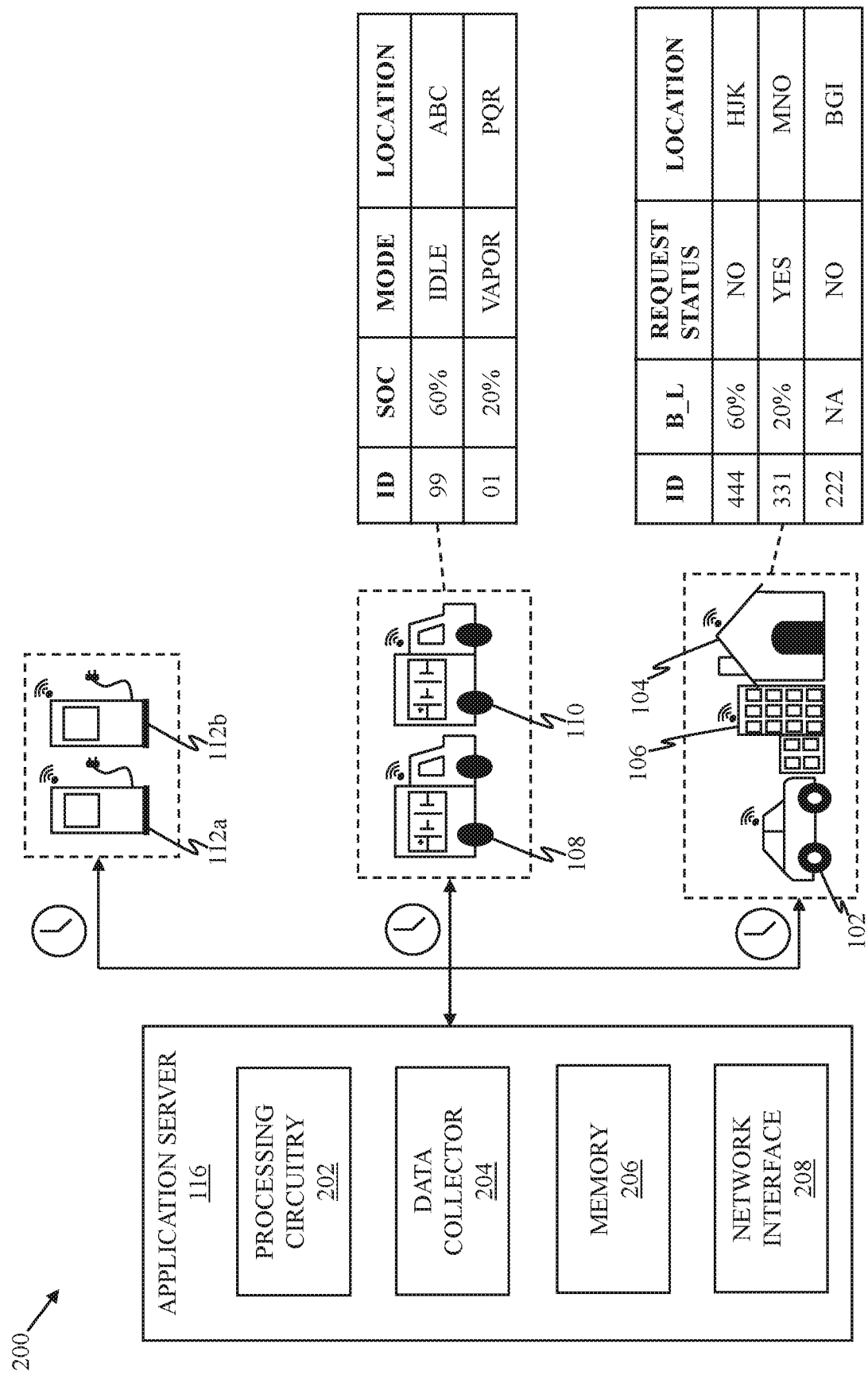
FIG. 2 is a block diagram that illustrates an application server of FIG. 1, in accordance with an exemplary embodiment of the present disclosure.

FIG. 2 is a block diagram that illustrates the application server, in accordance with an exemplary embodiment of the disclosure. With reference to FIG. 2, the application server 116 is shown. The application server 116 may include processing circuitry 202, a data collector 204, a memory 206, and a network interface 208.

The processing circuitry 202 may include suitable logic, circuitry, interfaces, and/or code, executable by the circuitry that may be configured to execute instructions stored in the memory 206 to perform various operations to facilitate transfer of charge from the nodes 102-106 to the mobile charging systems 108 and 110. The processing circuitry 202 may be configured to perform various operations associated with data collection and data processing. The processing circuitry 202 may be implemented by one or more processors, such as, but not limited to, an application-specific integrated circuit (ASIC) processor, a reduced instruction set computing (RISC) processor, a complex instruction set computing (CISC) processor, and a field-programmable gate array (FPGA) processor. The one or more processors may also correspond to central processing units (CPUs), graphics processing units (GPUs), network processing units (NPUs), digital signal processors (DSPs), or the like. It will be apparent to a person of ordinary skill in the art that the processing circuitry 202 may be compatible with multiple operating systems. For the sake of brevity, the operations performed by the processing circuitry are described with respect to the node 102.

The processing circuitry 202 may be configured to host the service application that is executable on the plurality of electronic devices 105a-105c and the plurality of driver devices 109a and 109b. The service application may be executable in various modes of operation as per functional requirements of users and drivers. For example, the service application may be executable in a user mode on the plurality of electronic devices 105a-105c and a driver mode on the plurality of driver devices 109a and 109b. In an embodiment, the processing circuitry 202 may be configured to receive, the request from the electronic device 105a, for transfer of charge from the energy storage device 103a of the node 102. The processing circuitry 202 may be further configured to determine the set of parameters of the energy storage device 103a based on the received request.

The processing circuitry 202 may have a machine learning model trained using machine learning techniques, decision tree algorithm, and neural network to learn patterns associated with usage data and behavioral data associated with the nodes 102-106. The processing circuitry 202 may be further configured to identify those mobile charging systems 108 and 110 that are available within the first geographical region associated with the node 102 and satisfy the set of parameters for the energy storage device 103a. The processing circuitry 202 may be configured to rank the identified mobile charging systems 108 and 110 in an order (e.g., descending order or ascending order) based on the health optimization criteria of the charging devices 111a and 111b of each of the identified mobile charging systems 108 and 110 and a distance of the mobile charging systems 108 and 110 from the node 102. The processing circuitry 202 may be further configured to render the user interface, via the electronic device 105a, to present the ranked mobile charging systems 108 and 110 to the corresponding user for selection. The processing circuitry 202 may be further configured to allocate one of the ranked mobile charging systems 108 and 110 to receive and store charge from the energy storage device 103a of the node 102. The processing circuitry 202 may be further configured to communicate allocation notification to the allocated mobile charging system (e.g., the mobile charging system 108). The processing circuitry 202 may be further configured to communicate the confirmation notification to the electronic device 105a to indicate the successful allocation of the mobile charging system 108. The processing circuitry 202 may be further configured to display, via the user interface of the electronic device 105a while the energy storage device 103a is being drained by the mobile charging system 108, the real-time energy level of the node 102, the unit of charge being transferred from the energy storage device 103a to the mobile charging system 108, and the remaining time to achieve the desired charge level for the energy storage device 103a.

The data collector 204 may include suitable logic, circuitry, interfaces, and/or code, executable by the circuitry, that may be configured to collect the data from the plurality of charging stations 112a and 112b, the plurality of mobile charging systems 108 and 110, and the plurality of nodes 102-106. The data collector 204 may be further configured to collect data from the plurality of electronic devices 105a-105c and the plurality of driver devices 109a and 109b. In an embodiment, the data collector 204 may collect the data in real-time or near real-time. In another embodiment, the data collector 204 may be configured to collect the data periodically (for example, after 30 seconds, 60 seconds, 90 seconds, 120 seconds, or the like). The data collector 204 may be configured to store the collected data in the memory 206 or the database 114. The data collector 204 may be implemented by one or more processors, such as, but not limited to, an ASIC processor, a RISC processor, a CISC processor, and an FPGA processor. The one or more processors may also correspond to CPUs, GPUs, NPUs, DSPs, or the like. It will be apparent to a person of ordinary skill in the art that the data collector 204 may be compatible with multiple operating systems. In an embodiment, the data may be collected by the data collector 204 by way of the service application executed on the plurality of electronic devices 105a-105c, the plurality of driver devices 109a and 109b, and the plurality of charging stations 112a and 112b.

The data collected from the plurality of mobile charging systems 108 and 110 may include a unique identifier of each of the mobile charging system 108 and 110, a state of charge (i.e., state of charge data) of the charging devices 111a and 111b of each mobile charging system 108 and 110, a mode of each mobile charging system 108 and 110, and a location (i.e., location data) of each mobile charging system 108 and 110. The unique identifier of each mobile charging system 108 and 110 may correspond to an alphabetical identifier, a numerical identifier, an alpha-numeric identifier, or a symbol that uniquely identifies the corresponding mobile charging system 108 or 110. The state of charge of each mobile charging system 108 and 110 may be an amount of electric charge that is stored in the charging devices 111a and 111b of the corresponding mobile charging system 108 or 110. The mode of each mobile charging system 108 and 110 may be an operational mode of the corresponding mobile charging system 108 or 110. The operational mode may be one of a vapor mode, an idle mode, and a drain mode. The vapor mode refers to the operational mode during which a mobile charging system is being charged at any of the plurality of charging stations 112a and 112b. The idle mode refers to the operational mode during which a mobile charging system is free, e.g., neither getting charged at any charging station 112a or 112b nor discharging or draining any of the plurality of nodes 102-106. The drain mode refers to the operational mode during which a mobile charging system is in use for draining charge from any of the plurality of nodes 102-106. The location data collected from each mobile charging system 108 and 110 indicate a current location of the corresponding mobile charging systems 108 or 110. As shown in FIG. 2, the data collected from the mobile charging system 108 may include the unique identifier "99", the state of charge (SOC) "60%", "idle" mode, and the current location "ABC". In an embodiment, the location may correspond to latitude and longitude co-ordinates, an address, or a landmark. The data collected from the mobile charging system 110 may include the unique identifier "01", the state of charge (SOC) "20%", "Vapor" mode, and the current location "PQR".

The data collected from the plurality of nodes 102-106 may include a unique identifier of each node of the plurality of nodes 102-106, an energy level of each node 102-106, a request status of each node 102-106, and a location of each node 102-106. The unique identifier of each node 102-106 may correspond to an alphabetical identifier, a numerical identifier, an alpha-numeric identifier, or a symbol that uniquely identifies the corresponding node 102-106. In an example, the unique identifier may be a vehicle identification number. The energy level of each node 102-106 may be an amount of electric charge that is stored in the corresponding energy storage device 103a-103c of the corresponding node 102-106. The request status of each node 102-106 may indicate if the request for transfer of charge has been initiated or transmitted corresponding to the nodes 102-106. The location data collected from each node 102-106 may indicate a current location of the corresponding node 102-106. As shown in FIG. 2, the data collected by the data collector 204 from the node 102 may include the unique identifier "444", the energy level "60%", the request status "NO", and the location "HJK". The data collected by the data collector 204 from the node 104 may include the unique identifier "331", the energy level "80%", the request status "YES, and the location "MNO". The data collected by the data collector 204 from the node 106 may include the unique identifier "222", the energy level "NA" (not available), the request status "NO", and the location "BGI".

The data collector 204 may be further configured to collect usage data associated with the plurality of nodes 102-106. Usage data collection is described in detail in conjunction with FIG. 4. In an embodiment, the data collector 204 may be configured to collect behavioral data associated with the user of the energy storage device 103*a*. In a non-limiting example, the behavioral data associated with the user may be obtained from user's schedule provided in a calendar in the electronic device 105*a*. The calendar may include a list of events and tasks planned for the user. The calendar may also include a list of events attended by the users in the past. For example, the calendar may include dates of planned vacations (if any) or dates of any upcoming travels for the user. The calendar may also include past details such as user's (the user of the energy storage device 103*a*) summer vacation planned with kids every summer from $8^{th}$ May to $9^{th}$ June. In another non-limiting example, the behavioral data associated with the user of the energy storage device 103*a* may be obtained based on user's interaction with the electronic device 105*a*.

The memory 206 may include suitable logic, circuitry, and interfaces that may be configured to store one or more instructions which when executed by the processing circuitry 202 and the data collector 204 cause the processing circuitry 202 and the data collector 204 to perform various operations to facilitate transfer of charge from the plurality of nodes 102-106 to the plurality of mobile charging systems 108 and 110. The memory 206 may be configured to store the user preferences, the usage data associated with the plurality of energy storage devices 103*a*-103*c*, and the health optimization criteria of the plurality of energy storage devices 103*a*-103*c*, and the charging devices 111*a* and 111*b* of each of the plurality of mobile charging systems 108 and 110.

The memory 206 may be accessible by the processing circuitry 202 and the data collector 204. Examples of the memory 206 may include, but are not limited to, a random-access memory (RAM), a read only memory (ROM), a removable storage drive, a hard disk drive (HDD), a flash memory, a solid-state memory, or the like. It will be apparent to a person skilled in the art that the scope of the disclosure is not limited to realizing the memory 206 in the application server 116, as described herein. In another embodiment, the memory 206 may be realized in form of a database or a cloud storage (e.g., the database 114) working in conjunction with the application server 116, without departing from the scope of the disclosure.

The network interface 208 may include suitable logic, circuitry, interfaces, and/or code, executable by the circuitry, that may be configured to enable the application server 116 to communicate with the database 114, the plurality of charging stations 112*a* and 112*b*, the plurality of mobile charging systems 108 and 110, and the plurality of nodes 102-106. The network interface 208 may be implemented as a hardware, software, firmware, or a combination thereof. Examples of the network interface 208 may include a network interface card, a physical port, a network interface device, an antenna, a radio frequency transceiver, a wireless transceiver, an Ethernet port, a universal serial bus (USB) port, or the like.

Figure 3:
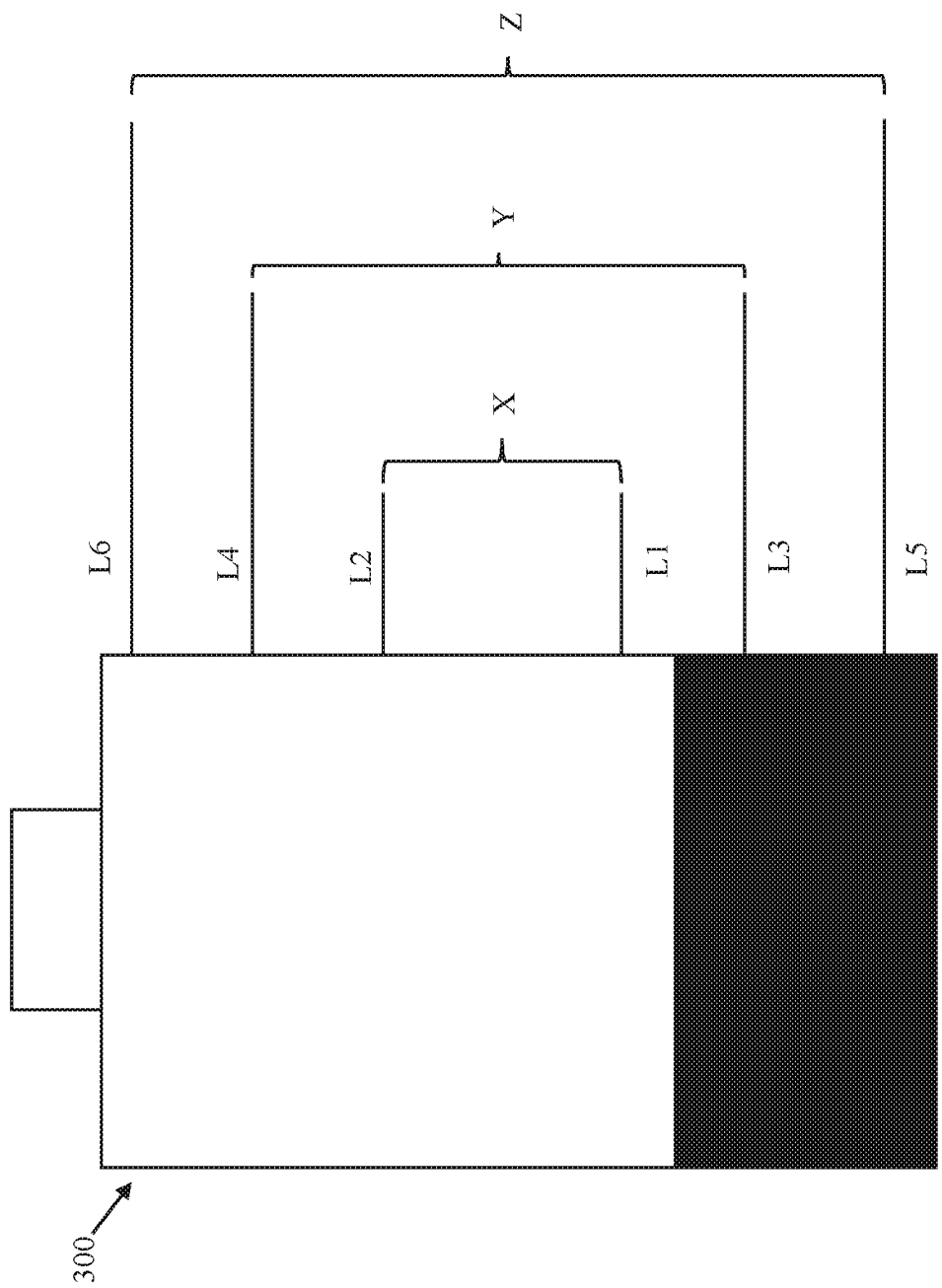
FIG. 3 is a diagram that illustrates health optimization criteria associated with a chargeable energy storage device, in accordance with an exemplary embodiment of the present disclosure.

FIG. 3 is a diagram that illustrates health optimization criteria associated with a chargeable energy storage device, in accordance with an exemplary embodiment of the present disclosure. With reference to FIG. 3, health optimization criteria associated with a chargeable energy storage device 300 is shown. The energy storage device 300 may be any of the plurality of energy storage devices 103*a*-103*c* of the plurality of nodes 102-106 or the charging devices 111*a* and 111*b* of the plurality of mobile charging systems 108 and 110. The health optimization criteria ensure that the energy storage device 300 is charged in a charging range that is optimal for maintaining good health and longevity of the energy storage device 300.

The energy storage device 300 is shown to have a plurality of charging levels L1, L2, L3, L4, L5, and L6. The plurality of charging levels L1-L6 form a plurality of charging ranges X, Y, and Z for the energy storage device 300. The charging range X refers to a range of charging the energy storage device 300 between the charging levels L1 and L2, the charging range Y refers to a range of charging the energy storage device 300 between the charging levels L3 and L4, and the charging range Z refers to a range of charging the energy storage device 300 between the charging levels L5 and L6.

Charging the energy storage device 300 in the charging range X may be the most optimal charging criterion for the energy storage device 300. In other words, charging the energy storage device 300 in the charging range X may ensure good health and increased lifespan of the energy storage device 300. In one example, when the charge of the energy storage device (e.g., the energy storage devices 103*a*-103*c*) is maintained in the charging range X, it may ensure good health and increased lifespan for the energy storage device of the node. Similarly, when the charge of the mobile charging systems (e.g., mobile charging systems 108 and 110) is maintained in the charging range X, it may ensure good health and increased lifespan for the charging devices 111*a* and 111*b* of the mobile charging systems 108 and 110.

The optimal charging criteria for the energy storage device 300 may vary based on a type of the energy storage device 300, an age of the energy storage device 300, a size of the energy storage device 300, a charge capacity (i.e. capacity to store electric charge) of the energy storage device 300, a region of operation of the energy storage device 300, a configuration of the energy storage device 300, and a make and model of one or more electronic components powered by the energy storage device 300. The environmental conditions (such as humidity, precipitation, temperature, and the like) to which the energy storage device 300 is exposed may affect the health of the energy storage device 300 (while in use or idle). Thus, determining the health optimization criteria of the energy storage device 300 based on the region of operation of the energy storage device 300 ensures that effects of the environmental conditions to which the energy storage device 300 is exposed are considered. The optimal charging criteria for the energy storage device 300 is a charging range within which the energy storage device 300 performs optimally and have an optimal lifespan. In an embodiment, a performance of the energy storage device 300 may degrade when it operates outside the charging range X, e.g., in the charging ranges Y and Z. Therefore, it is desirable to maintain the charge of the energy storage device 300 within a charging range X. In a scenario, where the chargeable energy storage device 300 is charged beyond the charging range X, the chargeable energy storage device 300 may consider transferring the excess charge to maintain the optimal charging range X in accordance with a forecasted usage of the chargeable energy storage device 300.

The application server 116 may be configured to determine the plurality of charging levels L1-L6, and the plurality of charging ranges X, Y, and Z for the energy storage device 300. The application server 116 may determine the plurality of charging levels L1-L6, and the plurality of charging ranges X, Y, and Z based on the type of the energy storage device 300, the age of the energy storage device 300, the size of the energy storage device 300, the capacity of the energy storage device 300, the region of operation of the energy storage device 300, the configuration of the energy storage device 300, and the make and model of the one or more electronic components powered by the energy storage device 300. The plurality of charging levels L1-L6 and the plurality of charging ranges X, Y, and Z may be dynamic in nature. In other words, the plurality of charging levels L1-L6 and the plurality of charging ranges X, Y, and Z may change with respect to time. The plurality of charging levels L1-L6 and the plurality of charging ranges X, Y, and Z may change, during life-span of the energy storage device 300, based on the make and model of the energy storage device 300, the type of the energy storage device 300, the age of the energy storage device 300, the size of the energy storage device 300, the charge capacity (i.e. capacity to store electric charge) of the energy storage device 300, the region of operation of the energy storage device 300, the configuration of the energy storage device 300, the make and model of the one or more electronic components powered by the energy storage device 300, an age of the of one or more electronic components, usages of the energy storage device 300, and a configuration of the one or more electronic components.

In one embodiment, the charging range X may be optimal for health of the energy storage device 103a of the node 102. In another embodiment, the charging range Y may be preferable for health of the energy storage device 103a of the node 102. In another embodiment, the charging range Z may be suboptimal for health of one of the energy storage device 103a of the node 102.

The health optimization criteria of the energy storage device 300 may indicate that when available charge in the energy storage device 300 is between levels L1-L2, the energy storage device 300 requires a first charge transfer rate to transfer the charge from the energy storage device 300 to any of the plurality of mobile charging systems 108 and 110. The health optimization criteria of the energy storage device 300 may further indicate that when available charge in the energy storage device 300 is between levels L3-L1 or levels L2-L4, the energy storage device 300 requires a second charge transfer rate to transfer the charge from the energy storage device 300 to any of the plurality of mobile charging systems 108 and 110.

In an embodiment, the application server 116 may be configured to prompt or remind the user of the node 102 to transfer the charge of the energy storage device 103a to maintain an optimal charging range determined for the energy storage device 103a. The application server 116 may prompt or remind the user via the electronic device 105a, a telematics device of the node 102, or an OBD device of the node 102, or a connected car network handled by a third-party server.

In an embodiment, the application server 116 may be configured to incentivize the plurality of users of the plurality of nodes 102-106 for maintaining the energy level of the plurality of nodes 102-106 within the optimal charging range. The plurality of users may be incentivized by offering discounted charging rates or costs, gift vouchers, discount coupons, offering to charge the plurality of nodes 102-106 when required, or the like. In another embodiment, the application server 116 may be configured to incentivize the drivers of the plurality of mobile charging systems 108 and 110 for maintaining the state of charge of the corresponding plurality of mobile charging systems 108 and 110 within the optimal charging range. The drivers are incentivized by offering bonus, paid leaves, good reviews, or the like. Beneficially, such incentivization by the application server 116 ensures good health, prolonged life, and better performance of the plurality of nodes 102-106 and the plurality of mobile charging systems 108 and 110.

Hereinafter, the terms health optimization criteria of a node and health optimization criteria of an energy storage device of the node are interchangeably used. Further, the terms "health optimization criteria of a mobile charging system" and "health optimization criteria of a charging device of the mobile charging system" are interchangeably used.

Figure 4:
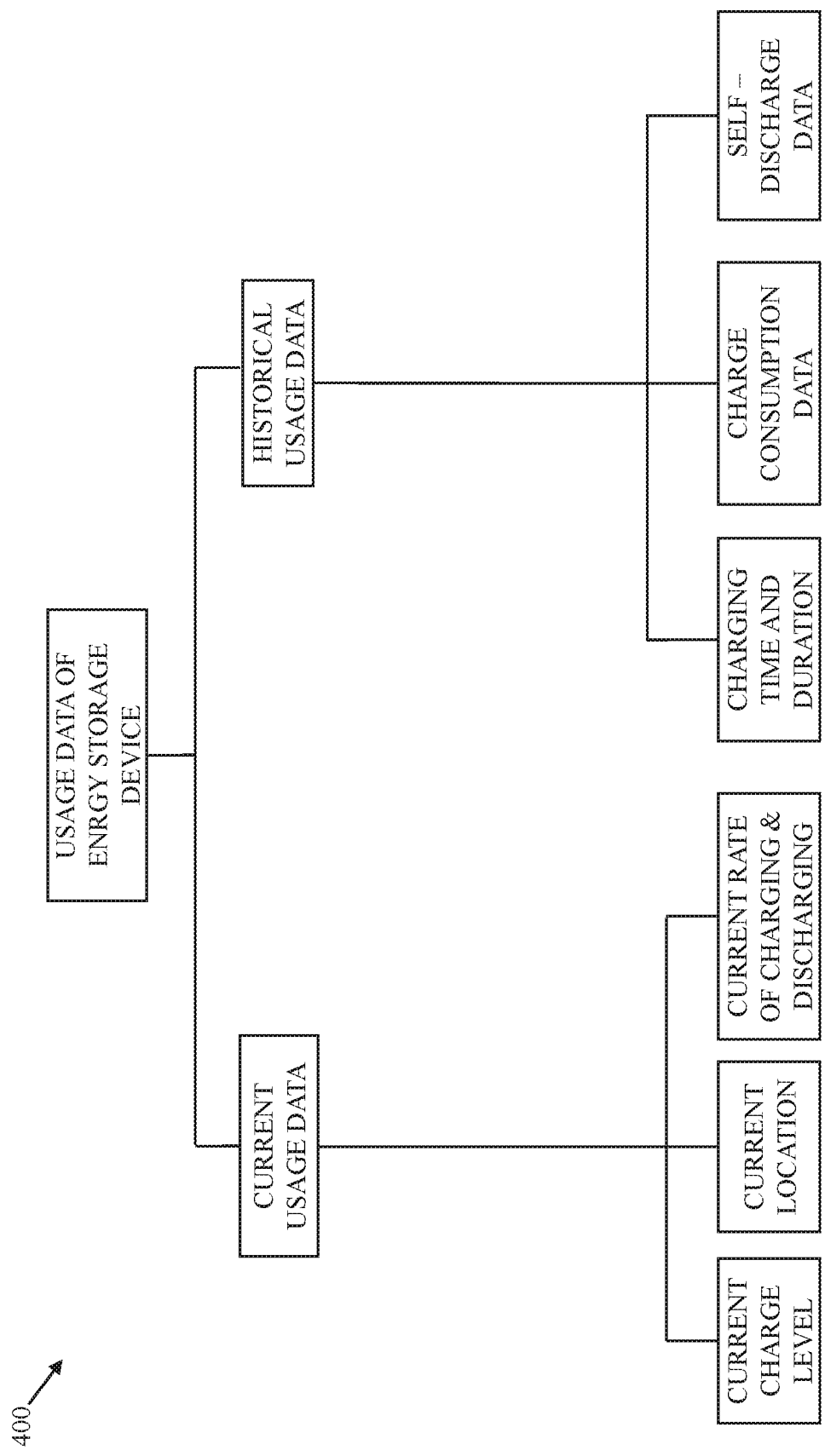
FIG. 4 is a block diagram that illustrates usage data of a node as collected by the application server, in accordance with an embodiment of the present disclosure.

FIG. 4 is a block diagram that illustrates usage data of an energy storage device collected by the application server, in accordance with an exemplary embodiment of the present disclosure. With reference to FIG. 4, a block diagram 400 is shown that illustrates usage data of the energy storage device 103a of node 102 collected by the application server 116. The usage data may include current usage data of the energy storage device 103a and historical usage data of the energy storage device 103a. The usage data may be collected by the data collector 204 of the application server 116. The data collector 204 may be further configured to store the usage data in the database 114 and/or memory 206. The current usage data may include one or more parameters or attributes associated with the current state of charge of the energy storage device 103a. For example, the current usage data of the energy storage device 103a may include current energy level of the energy storage device 103a, current location of the node 102, and current rate of charging or discharging of the energy storage device 103a. The historical usage data associated with the energy storage device 103a may include time of charging, a pattern associated with consumption of charge, a time after which self-discharge action of the energy storage device 103a is initiated, time taken to completely self-discharge, time and number of hours for which the energy storage device 103a is inactive, pattern of inactivity of the energy storage device 103a, or the like. As new current usage data are received from the energy storage device 103a, the previously received current usage data are merged with the historical usage data and hence, the historical usage data gets updated. In an embodiment, the data collector 204 may be configured to obtain current usage data from the electronic device 105a in real time, in near real time, periodically, or the like.

In an embodiment, the application server 116 may be configured to retrieve the usage data (including the current usage data and the historical usage data) of the energy storage device 103a and behavioral data of the user from the database 114 and/or memory 206. Based on the retrieved usage data and the behavioral data, the application server 116 may be configured to forecast a period of inactivity of the energy storage device 103a. In an embodiment, the processing circuitry 202 of the application server 116 may process the usage data and the behavioral data to forecast a possible period of inactivity for the energy storage device 103a. The application server 116 may transmit the forecasted period of inactivity of the energy storage device 103a to the electronic device 105a to seek a confirmation from the user of the node 102. Upon receipt of the forecasted period of inactivity, the electronic device 105a, upon user's consent, may request transfer of charge from the energy storage device 103a to avoid self-discharge of the energy storage device 103a during the period of inactivity and optimally utilize the stored charge.

In an embodiment, the application server 116 may be configured to notify the user of the electronic device 105a that the forecasted period of the inactivity of the energy storage device 103a is greater than the threshold inactivity period. In an embodiment, the threshold inactivity period may be set by the user of the node 102. In another embodiment, the threshold inactivity period may be determined by the application server 116 based on self-discharge history included in the historical usage data or health optimization criteria of the energy storage device 103a. For example, the historical usage data may indicate that the energy storage device 103a starts self-discharging if not used for more than 3 days. In such a scenario, the application server 116 may determine the threshold inactivity period to be 3 days. In another example, the health optimization criteria may indicate that if the energy storage device 103a charged up to A % is not used for 5 days, the health (for example, charge storage capacity) of the energy storage device 103a degrades. In such a scenario, the application server 116 may determine the threshold inactivity period to be 5 days.

In order to avoid such self-discharge of the energy storage device 103a or degradation of the health of the energy storage device 103a, the application server 116 may be configured to transmit a recommendation to the electronic device 105a that recommends the user of the node 102 to initiate a request to transfer the charge stored in the energy storage device 103a. For example, if the forecasted period of inactivity of the energy storage device 103a is "Y" hours and the threshold inactivity period is "X" hours such that the value of "Y" is greater than "X", the application server 116 may transmit a recommendation to the electronic device 105a to initiate a request to transfer the charge stored in the energy storage device 103a, thereby avoiding self-discharge or dissipation of the stored energy without being effectively used or avoiding degradation of the health of the energy storage device 103a. In an example, the user associated with the energy storage device 103a may be going on a vacation for 7 days. In such a scenario, the forecasted period of the inactivity will be 7 days, i.e., 24*7=168 hours. The threshold inactivity period associated with the energy storage device 103a as determined by the application server 116 may be 48 hours. In such a scenario, as the forecasted period of inactivity is greater than the threshold inactivity period, the application server 116 may notify the electronic device 105a that the forecasted period of the inactivity of the energy storage device 103a is greater than the threshold inactivity period. Subsequently, the application server 116 may transmit a recommendation to the electronic device 105a to initiate a request to transfer the charge, to avoid self-drain of the stored charge or degradation of the health of the energy storage device 103a.

In an embodiment, the historical usage data may include time, date, and frequency of calibrating the energy storage device 103a. A reliable way to gauge into exact charge storage capacity of the energy storage device 103a is to periodically calibrate or re-calibrate the energy storage device 103a. The calibration of an energy storage device 103a helps to reset upstream (e.g., complete charge/full charge or upper limit) and low stream (e.g., complete drain or lower limit) values of the energy storage device 103a, thereby keeping estimated charge storing capacity of the energy storage device 103a updated and accurate. If the calibration of the energy storage device 103a is not carried out periodically, the estimated charge storage capacity of the energy storage device 103a often gets inaccurate, thus resulting in inaccurate range prediction or inaccurate prediction of expected time to completely discharge.

Although calibrating the energy storage device 103a is a necessity, it is often not preferred by a user of the energy storage device 103. This is because the process of calibration involves first fully charging an energy storage device and then fully discharging the energy storage device or vice-versa, to measure the charge storage capacity of the energy storage device 103a. Thereafter, the difference in the charge storage capacity of the energy storage device 103a is measured by comparing the measured charge storage capacity to an earlier charge storage capacity, for example, a previously measured or original charge storage capacity of the energy storage device 103a. Accordingly, by estimating the charge storage capacity of the energy storage device 103a, a state of health of the energy storage device 103a may be ascertained. Thus, the process of calibration involves draining the charge from a fully charged energy storage device, leading to the wastage of all the charge from the fully charged energy storage device. However, with the embodiments described in this disclosure, the wastage of charge from the energy storage device 103a may be minimized by transferring the charge from the charged energy storage device 103a to one of the plurality of mobile charging systems 108, thus making the process of calibration more power efficient.

Figure 5:
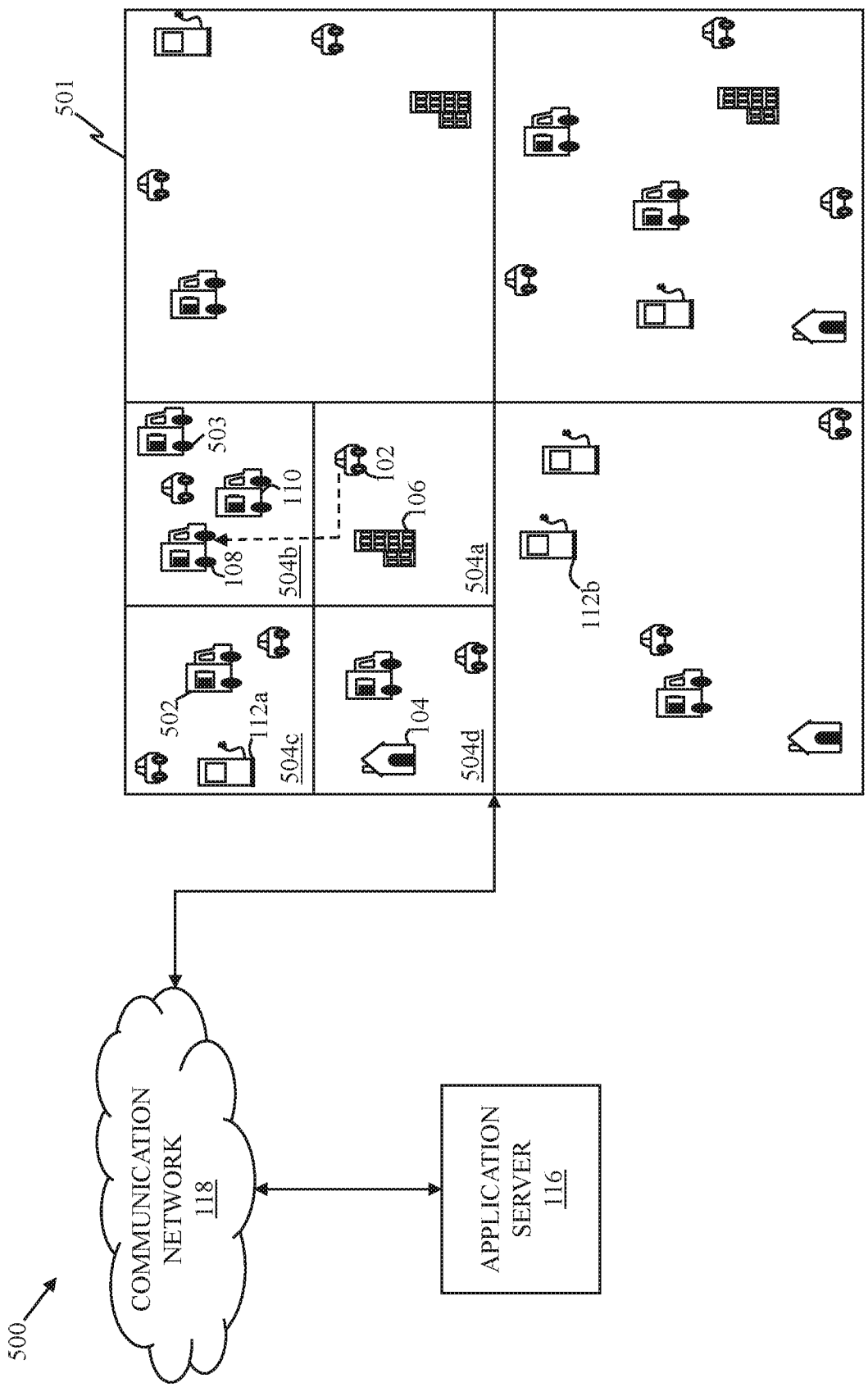
FIG. 5 is a diagram that illustrates an exemplary scenario for facilitating transfer of charge from a node to a mobile charging system, in accordance with an exemplary embodiment of the present disclosure.

FIG. 5 is a diagram that illustrates an exemplary scenario for facilitating transfer of charge from a node to a mobile charging system, in accordance with an exemplary embodiment of the present disclosure. With reference to FIG. 5, an exemplary scenario 500 is shown to describe facilitation of charge transfer from the node 102 to the mobile charging system 108.

The application server 116 may be configured to host the service application. The plurality of electronic devices 105a-105c and the plurality of driver devices 109a and 109b may be configured to execute the service application hosted by the application server 116. The application server 116 may be further configured to collect the data from the plurality of electronic devices 105a-105c, the plurality of driver devices 109a and 109b, and the plurality of charging stations 112a and 112b as described in FIGS. 2 and 3. For example, the application server 116 may collect the energy level data and the location data of the plurality of nodes 102-106 from the corresponding plurality of electronic devices 105a-105c. The application server 116 may further collect the state of charge data and the location data of the plurality of mobile charging systems 108 and 110 from the corresponding plurality of driver devices 109a and 109b.

In a non-limiting example, it is assumed that the plurality of nodes 102-106 and the plurality of mobile charging systems 108 and 110 are located within a geographical region 501. The geographical region 501 may further include other mobile charging systems, such as mobile charging systems 502 and 503. The application server 116 may be configured to segregate the geographical region 501 into a grid having multiple cells, such as 504a, 504b, 504c, and 504d, or the like. A size of each cell is determined based on a level of optimization to be achieved by the application server 116.

In an embodiment, the application server 116 may be further configured to deploy the plurality of mobile charging systems 108 and 110 in the geographical region "P" based on historical analysis of demand for transfer of charge observed at different timeslots. Further, the application server 116 may be configured to deploy the plurality of mobile charging systems 108 and 110 in the geographical region "P" based on a foreseen frequency of transfer of charge requests (i.e., expected demand) during different timeslots. In an example, the application server 116 may increase a number of deployed mobile charging systems in the cell 504a during a first timeslot when a high frequency (e.g., frequency greater than a frequency threshold) of transfer of charge requests is expected in the cell 504a. In another example, the application server 116 may decrease the number of deployed mobile charging systems in the cell 504a during a second timeslot when a low frequency of transfer of charge requests (e.g., frequency less than the frequency threshold) is expected in the cell 504a. It will be apparent to a person of ordinary skill in the art that the exemplary scenario 500 illustrates a specific time instance of a timeslot.

Based on the location data received from the plurality of nodes 102-106 and the plurality of mobile charging systems 108 and 110, the application server 116 may be configured to locate the plurality of nodes 102-106 and the plurality of mobile charging systems 108 and 110 on the grid. In other words, the application server 116 may generate a grid map of the geographical region "P" and position the plurality of nodes 102-106 and the plurality of mobile charging systems 108 and 110 on the generated grid map. Such positioning is performed based on the real-time location data received from the plurality of electronic devices 105a-105c and the plurality of driver devices 109a and 109b.

The application server 116 may be configured to receive a request, to transfer charge from the energy storage device 103a, via the electronic device 105a associated with the node 102. The request may be indicative of the current energy level of the energy storage device 103a and/or a charge level desired to be achieved for the energy storage device 103a. In one embodiment, the request may further include a contact information (for example, a phone number) associated with a user of the node 102, the unique identifier of the node 102, and a make and a model of the node 102. The request may be further indicative of a desired charge level of the node 102, a maximum charge transfer rate supported by the energy storage device 103a, and a minimum charge transfer rate supported by the energy storage device 103a. The desired charge level of the energy storage device 103a may indicate an amount (for example, a ratio, a percentage, a range, or the like) of electric charge that should be maintained in the energy storage device 103a as defined by the user of the node 102. The maximum charge transfer rate supported by the energy storage device 103a may be the maximum amount of energy that can be drained from the energy storage device 103a in a unit time based on the configuration of the energy storage device 103a. The minimum charge transfer rate supported by the energy storage device 103a may be a minimum amount of energy that can be drained from the energy storage device 103a in a unit time based on the configuration of the energy storage device 103a.

In an embodiment, the application server 116 may be configured to create a user profile associated with the electronic device 105a. The user profile is created when a request to transfer charge is received from the electronic device 105a for the first time or when the service application is installed or accessed on the electronic device 105a by the user. The application server 116 may be configured to store the user profile in the database 114. The user profile may store information associated with the user of the electronic device 105a or the energy storage device 103a associated with the electronic device 105a. In an embodiment, the user profile may store preferences of the user of the electronic device 105a, such as a desired charge level to be achieved for the energy storage device 103a, a desired location for transferring the charge from the energy storage device 103a, cost of transferring the charge from the energy storage device 103a, a health status of the energy storage device 103a, health optimization criteria of the energy storage device 103a, a configuration of the energy storage device 103a, a history of the energy storage device 103a, a threshold period of inactivity, and/or an energy level or range of electric charge at which the energy storage device 103a has transferred the charge in the past.

In one embodiment, the request may be generated/initiated via a third-party application (for example, Alexa® application, Google Assistant®, or the like) being executed on the electronic device 105a or the telematics device of the node 102. The generated request is transmitted, via the electronic device 105a to the application server 116 based on an input received by the electronic device 105a from the user.

In an embodiment, the application server 116 may be configured to receive, from the electronic device 105a, energy level data of the node 102. The energy level data may indicate a current energy level of the node 102. In an embodiment, the application server 116 may be configured to receive the request for transfer of charge from the energy storage device 103a of the node 102 based on an input received from the user associated with electronic device 105a. In another embodiment, the application server 116 may be configured to automatically transmit a recommendation to the electronic device 105a to initiate the request for transfer of charge from the energy storage device 103a of the node 102 based on the usage data. For example, the application server 116 may have a recommendation generator module that may be trained using machine learning techniques such as k-means algorithm, decision tree algorithm, neural network, or the like. The recommendation generator module may be trained based on the user preference, health optimization criteria, and usage data. The trained recommendation generator module may be configured to generate a recommendation for transfer of charge from the node 102, automatically i.e., without human intervention, based on one of the current energy level of the node 102, the health optimization criteria for the energy storage device 103a, the user preference, the usage data (including the current usage data and historical usage data gathered from past sessions), and/or the like. In another embodiment, the application server 116 may automatically initiate a request for transfer of charge, upon the consent of the user, from the energy storage device 103a of the node 102 based on the usage data as described with reference to FIG. 4.

In an embodiment, the electronic device 105a may request transfer of charge from the energy storage device 103a to a mobile charging system (for example, the mobile charging system 108) based on the recommendation. In another embodiment, the electronic device 105a may automatically initiate the request to transfer charge based on criteria predetermined by the user of the electronic device 105a. For example, the predetermined criteria may include request to transfer the charge from the node 102 every Friday at 8 pm as the user does not need charge for next 55 hours or request to transfer the charge from the node 102 every last Friday of the month for maintenance of the energy storage device 103a or request transfer of charge from the node 102 based on the historical usage data or the like.

The application server 116 may be further configured to determine the set of parameters for the node 102 having the energy storage device 103a based on the received request. The set of parameters may include determining an amount of charge required to be transferred from the energy storage device 103a (shown in FIG. 1) of the node 102, the turn-around time for achieving transfer of the determined amount of charge, and the desired charge transfer rate of the energy storage device 103a (shown in FIG. 1) of the node 102. In an example, the node 102 may require transferring 40 kWh of charge (or energy), the turn-around time may be 80 minutes, and the desired charge transfer rate may be 1C.

The application server 116 may further determine the set of parameters based on the information stored in the user profile associated with the node 102. The set of parameters may be further determined based on the user preferences of the electronic device 105a. The application server 116 may further determine the set of parameters based on the usage data associated with the energy storage device 103a.

Upon determining the set of parameters, the application server 116 may be configured to identify one or more of the plurality of mobile charging systems 108 and 110 that are available within the first geographical region associated with the node 102 and satisfy the set of parameters for the energy storage device 103a. The application server 116 may be configured to locate, based on the location data of the electronic device 105a, a cell in the grid map where the node 102 is present. As shown in FIG. 5, the node 102 is present in the cell 504a. The application server 116 then searches in the cell 504a for various mobile charging systems that satisfy the set of parameters of the energy storage device 103a.

In an exemplary scenario, the application server 116 may determine that cell 504a does not include any mobile charging system that satisfies the set of parameters of the energy storage device 103a. Therefore, the application server 116 may expand the search region to include the cell 504b. The application server 116 may then identify that the cell 504b includes three mobile charging systems 108, 110, and 503. The application server 116 may be configured to identify those mobile charging systems 108, 110, and 503 in the cell 504b that satisfy the set of parameters of the energy storage device 103a. For example, the application server 116 may identify that the plurality of mobile charging systems 108 and 110 satisfy the set of parameters of the energy storage device 103a and the mobile charging system 503 does not satisfy the set of parameters of the energy storage device 103a.

In one example, the mobile charging system 503 may already be sufficiently charged and may not have enough space available to receive the determined amount of charge from the energy storage device 103a. In another example, the mobile charging system 503 may have a higher turn-around time than required for transfer of the charge from the energy storage device 103a. In another example, the mobile charging system 503 may not offer the charging rate required to transfer charge from the energy storage device 103a. In another example, the mobile charging system 503 may have a different configuration or charging protocol than supported by the energy storage device 103a for transfer of charge. Thus, the application server 116 may discard the mobile charging system 503 and may only identify those mobile charging systems 108 and 110 that satisfy the set of parameters of the energy storage device 103a. In other words, the mobile charging systems 108 and 110 that are identified are capable of receiving the determined amount of charge from the energy storage device 103a, have a lower or same turn-around time required for transfer of charge from the energy storage device 103a, and have the same configuration or charging protocol as supported by the energy storage device 103a for transfer of charge.

After identifying the mobile charging systems 108 and 110, the application server 116 may be configured to rank the identified mobile charging systems 108 and 110 in an order, for example, ascending order or descending order. The identified mobile charging systems 108 and 110 may be ranked in the order based on the health optimization criteria of the charging devices 111a and 111b of each identified mobile charging system 108 and 110. The health optimization criteria of the charging device 111a or 111b may include one or more constraints defined for maintaining a good health of the charging device 111a or 111b of each identified mobile charging system 108 and 110. The health optimization criteria may be the same or different for different charging devices. The health optimization criteria may be dynamic in nature and may tend to change during lifetime of the identified mobile charging systems 108 and 110. In an embodiment, the health optimization criteria of each of the charging devices 111a or 111b may correspond to a charging range, having lower and upper limits of charge, within which the charging device 111a or 111b of the identified mobile charging systems 108 and 110 should be charged to maintain a good health. Therefore, the application server 116 may be configured to rank the identified mobile charging systems 108 and 110 in the order based on the availability to receive the determined amount of electric charge and the health optimization criteria of the charging device 111a or 111b after receiving charge from the node 102.

In an exemplary scenario, the charging device 111a of the mobile charging system 108 may be available to receive charge of 80 kWh and the health optimization criteria may indicate to receive a maximum charge of 60 kWh. Similarly, the charging device 111b of the mobile charging system 110 may be available to receive charge of 120 kWh and the health optimization criteria of the charging device 111b may indicate to receive a maximum charge of 40 kWh. Thus, upon receiving a request for transfer of 50 kWh, the application server 116 may rank the mobile charging system 108 higher than the mobile charging system 110, as the charging request for 50 kWh violates the health optimization criteria of the mobile charging system 110.

Figures 6A, 6B, 6C:
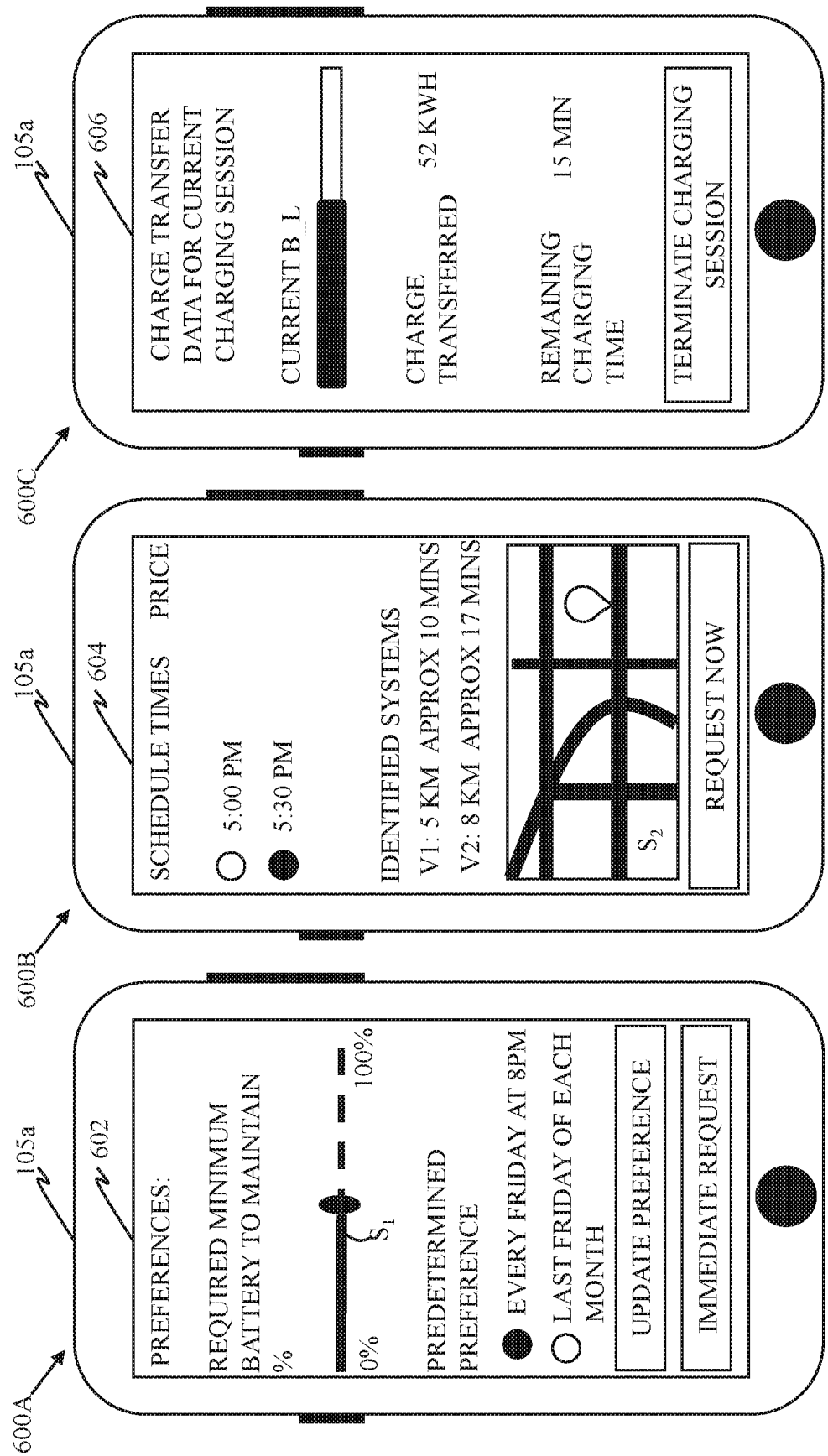
FIGS. 6A, 6B, and 6C are diagrams that illustrate user interfaces rendered by the application server of FIG. 1 on a display of an electronic device associated with a node of FIG. 1, in accordance with an exemplary embodiment of the present disclosure.

The application server 116 may rank the identified mobile charging systems 108 and 110 further based on the turn-around time associated with each identified mobile charging system 108 and 110 to receive charge from the energy storage device 103a (as shown in FIG. 6B). The turn-around time for a mobile charging system may be a cumulative sum of the time required by the mobile charging system to travel from a first location (e.g., a current location) to a second location of the node 102 and the time required by the mobile charging system to drain the energy storage device 103a after reaching the second location. The application server 116 may be configured to determine the turn-around time for each identified mobile charging system 108 and 110. For example, the application server 116 may determine the cumulative sum of the time required by the mobile charging system 108 to travel from the first location to the second location of the node 102 based on real-time or near real-time traffic congestion along a route between the first location and the second location, a distance between the first location and the second location, a travel speed of the mobile charging system 108, and current environmental conditions (e.g., thunderstorm, rain, and or the like) along the route. Further, the application server 116 may determine the time required by the mobile charging system 108 to receive charge from the energy storage device 103a. The application server 116 may rank the identified mobile charging systems 108 and 110 in an order of increasing turn-around time, i.e., the mobile charging system with minimum turn-around time is ranked highest and the mobile charging system with maximum turn-around time is ranked lowest.

The application server 116 may rank the identified mobile charging systems 108 and 110 further based on an estimated time of arrival at the second location from the corresponding first location. For example, the application server 116 may rank the identified mobile charging systems 108 and 110 in an order of increasing estimated time of arrival, i.e., the mobile charging system with a minimum estimated time of arrival is ranked highest and the mobile charging system with a maximum estimated time of arrival is ranked lowest.

In an embodiment, the application server 116 may be configured to rank the identified mobile charging systems 108 and 110 in the order based on a combination of the abovementioned factors, e.g., the health optimization criteria, the charge transfer rate, the turn-around time, and the cost of charging. The application server 116 may be further configured to present the ranked list of the identified mobile charging systems 108 and 110 to the user, via the user interface of the electronic device 105a (as shown in FIG. 6B).

The application server 116 may be configured to allocate one of the ranked mobile charging systems 108 and 110 to the node 102 to receive charge from the energy storage device 103a. In one embodiment, the application server 116 may allocate one of the ranked mobile charging systems 108 and 110 based on the ranking. For example, the application server 116 may allocate the mobile charging system 108 that has the highest rank to receive charge from the node 102. Beneficially, such optimal allocation based on ranking ensures optimal utilization of the mobile charging systems 108 and 110. In another embodiment, the application server 116 may allocate one of the ranked mobile charging systems 108 and 110 to the node 102 for receiving charge from the energy storage device 103a based on the user preference of the user of the node 102. For example, the user of the node 102 may select the mobile charging system 110 from the ranked identified mobile charging systems 108 and 110 for receiving charge from the node 102 and storing the charge.

The application server 116 may be further configured to communicate an allocation notification to the mobile charging system 108 by way of the driver device 109a. The allocation notification may include information pertaining to the second location of the node 102 and the unique identifier of the node 102. The mobile charging system 108 may communicate an allocation response to the application server 116 by way of the driver device 109a to indicate an acceptance or rejection of the charging request by the driver of the mobile charging system 108. In one example, the mobile charging system 108 may not communicate the allocation response within a specific time interval (for example, 30 seconds, 60 seconds, 2 minutes, or the like). In such a scenario, the application server 116 may be configured to communicate the allocation notification again to the mobile charging system 108. The application server 116 may resend the allocation notification to the mobile charging system 108 for a fixed number of times such as 2, 3, 4, 5, or the like. However, when no allocation response is received from the mobile charging system 108 after the fixed number of attempts or the request for transfer of charge is rejected by the driver of the mobile charging system 108, the application server 116 may communicate a new allocation notification to the other identified mobile charging system 110. The other mobile charging system 110 may be next in ranking to the mobile charging system 108.

In one embodiment, the application server 116 may be configured to communicate a confirmation response to the electronic device 105a of the node 102. The confirmation response includes a unique identifier of the mobile charging system 108 and the real-time location of the mobile charging system 108. The confirmation notification may be further indicative of real-time location tracking information associated with the mobile charging system 108. Beneficially, the real-time location tracking information allows the user of the electronic device 105a to track and monitor the arrival of the mobile charging system 108 at the second location. In one embodiment, the application server 116 may be configured to communicate an arrival notification, upon arrival of the mobile charging system 108 at the second location, to the user of the node 102 via the electronic device 105a.

The application server 116 may be further configured to display, via the user interface on the electronic device 105a while the charge is being transferred from the energy storage device 103a to the mobile charging system 108, a real-time energy level of the node 102, units of charge received by the mobile charging system 108 from the energy storage device 103a, an estimated cost in lieu of the transferred charged, and a remaining time to transfer the determined amount of charge from the energy storage device 103a to the desired charge level. The user of the electronic device 105a may track the real-time charging of the energy storage device 103a through the user interface. The user of the electronic device 105a may track the amount of charge transferred to the mobile charging system 108 based on the unit of charge transferred from the energy storage device 103a to the mobile charging system 108. Beneficially, the user may decide to terminate or continue the transfer of charge based on the amount of charge being transferred. In an embodiment, the mobile charging system 108 may be configured to receive the amount of charge from the energy storage device 103a and instead of storing the received amount of charge in the charging device 111a, the mobile charging system 108 may supply the received amount of charge to a power grid. In an embodiment, the mobile charging system 108 may execute concurrent operations of receiving the charge from the energy storage device 103a and supplying the received amount of charge to the power grid.

In an embodiment, the application server 116 may be configured to enable the mobile charging system 108 to access a charging port of the node 102 for transfer of the charge from the node 102 to the mobile charging system 108. For example, the application server 116 may enable the user of the node 102 to remotely control access to the charging port of the node 102 via the service application running on the electronic device 105a. In another embodiment, the application server 116 may be configured to provide a password, via the driver device 109a of the mobile charging system 108 to unlock the charging port. In an embodiment, the application server 116 may be configured to unlock the charging port via a cloud-based control for the node 102. The application server 116 may be further configured to terminate access to the charging port upon completion of the transfer of charge session.

In an exemplary scenario, on reaching the second location of the node 102, the mobile charging system 108 may be configured to communicate an access request to the application server 116 via the driver device 109a. In another embodiment, the mobile charging system 108 may communicate the access request upon receiving the allocation notification. The mobile charging system 108 may be further configured to authenticate corresponding identity with the application server 116. In an embodiment, the mobile charging system 108 may be configured to communicate a corresponding system identification number to the application server 116. The application server 116 may be configured to compare the received system identification number with a previously stored list of system identification numbers of the plurality of mobile charging systems 108 and 110. The identity of the mobile charging system 108 is successfully authenticated based on a match of the received system identification number. In another embodiment, the mobile charging system 108 may be configured to communicate a password to the application server 116. The application server 116 may be configured to verify the password to authenticate the identity of the mobile charging system 108. The application server 116 may be configured to provide the access to the charging port of the node 102 to the mobile charging system 108. In an embodiment, the application server 116 may be configured to communicate a password to open the charging port. In another embodiment, based on a consent of the user of the node 102, the application server 116 may be configured to open the charging port via a cloud-based control for accessing different components of the node 102. The cloud-based control may be used, by the application server 116, to control closing and opening of the charging port of the node 102. The mobile charging system 108 may be configured to communicate a task completion notification to the application server 116 via the driver device 109a, upon completion of the charge transfer session. The application server 116, upon receiving the task completion notification, terminates the access to the charging port of the node 102. In one embodiment, the application server 116 may be configured to close the charging port, via the cloud-based control, upon receiving the task completion notification.

In an embodiment, the application server 116 may facilitate the transfer of charge from the node 102 to one of the plurality of the mobile charging systems (for example, the mobile charging system 108) when the energy storage device 103a is to undergo the process of recalibration. For example, when the energy storage device 103a is being recalibrated, the energy storage device 103a is first completely charged. Subsequently, the completely charged energy storage device 103a is the completely drained (or discharged) or vice-versa, to obtain charge storage capacity of the energy storage device 103a. Finally, a difference between an initial charge storage capacity and the current charge storage capacity of the energy storage device 103a is obtained to recalibrate the energy storage device 103a.

Embodiments disclosed in the disclosure may be used for draining the charge from the energy storage device 103a until the charged energy storage device 103a is completely drained or discharged. The charge may be drained from the completely charged energy storage device 103a by transferring the charge from the energy storage device 103a to the mobile charging system 108. Accordingly, with the embodiments described in this disclosure, the charge from the energy storage device 103a is not wasted during the process of recalibration. In fact, the charge is optimally utilized by transferring to the mobile charging system or any other system which needs the charge. In an embodiment, the application server 116 may be further configured to calibrate an upper limit and a lower limit of the charge storage capacity of the energy storage device 103a based on complete drain of the charged energy storage device 103a. The application server 116 may calibrate the energy storage device 103a using various know calibration techniques, details of which are omitted for the sake of brevity.

Thus, the advantage of the present disclosure is that the stored charge of the energy storage device 103a is effectively used by transferring the charge to the mobile charging system 108, thereby avoiding wastage of the charge due to self-drain or during calibration. Additionally, due to the charging of the mobile charging system 108 through the energy storage device 103a, the load on the plurality of charging stations 112a and 112b or the electric grid may be reduced. Hence, one or more mobile charging stations of the plurality of charging stations 112a and 112b may be easily made available to another mobile charging system looking to charge corresponding charging device.

In an embodiment, the charge may be transferred from the energy storage device 103a in lieu of one or more incentives. In an embodiment, one or more incentives may include a gift, a voucher, a discount coupon, reward points, or a credit note upon successful transfer of the determined amount of charge from the energy storage device 103a to the first mobile charging system 108. In another embodiment, the charge may be transferred from the energy storage device 103a in consideration of payment or in exchange of charge.

FIGS. 6A, 6B, and 6C are diagrams 600A-600C that illustrate user interfaces rendered by the application server on display of an electronic device, in accordance with an exemplary embodiment of the disclosure. With reference to FIGS. 6A, 6B, and 6C, user interfaces 602, 604, and 606 rendered by the application server 116 on the display of the electronic device 105a associated with the node 102 are shown.

With reference to FIG. 6A, the user interface 602 is rendered on the display of the electronic device 105a for obtaining the user preference from the user of the electronic device 105a. Similar user interfaces may be rendered on displays of the electronic devices 105b and 105c for obtaining user preferences from the corresponding users, without deviating from the scope of the disclosure. The user interface 602 includes a slider scale $S_1$ for adjusting a minimum energy level to be maintained in the energy storage device 103a after the transfer of the charge. The user interface 602 further includes additional preference fields associated with radio buttons. The radio button may be selected based on input received from the user. For example, the user may enter its preference to request transfer of the charge from the node 102 every Friday at 8 pm as the user does not need charge for next 55 hours or request to transfer the charge from the node 102 last Friday of every month for maintenance of the energy storage device 103a, or request transfer of charge from the node 102 based on the historical usage data or the like. The user interface 602 further includes a button "UPDATE PREFERENCE" using which the preferences submitted by the user may be updated. The user interface 602 further includes a button "IMMEDIATE REQUEST", which upon selection initiates the request for transfer of charge from the energy storage device 103a associated with node 102.

In one embodiment, the user interface may be configured to receive input, regarding the user preferences, from the user based on a manual entry via a touchscreen or a keyboard, a touch and/or scroll input, a voice input, a movement based input (for example, shaking an electronic device (e.g., the electronic device 105a) left and right to increment or decrement the desired charge level), or the like.

With reference to FIG. 6B, the user interface 604 is rendered on the display of the electronic device 105a to present the mobile charging systems 108 and 110 (i.e., identified as V1 and V2) ranked by the application server 116 to the user. The user interface 604 includes a list of time slots when one or more of the mobile charging systems 108 and 110 are available to receive charge. The user interface 604 further includes a list of the ranked mobile charging systems 108 and 110, corresponding distances from the node 102, and corresponding travel times to reach the node 102. The user interface 604 further includes a location tracking section S2 (for example, a street view, a GPS location, a tracking information, and the like) that displays real-time or near real-time location information of the mobile charging system that is selected from the displayed list. The real-time locations are updated on the user interface 604 based on a movement of the mobile charging systems 108 and 110.

The user interface 604 also includes a button "REQUEST NOW" for requesting the selected mobile charging system to receive charge from the energy storage device 103a.

With reference to FIG. 6C, the user interface 606 is rendered on the display of the electronic device 105a for displaying, while the charge is being transferred from the energy storage device 103a to the mobile charging system 108, the real-time energy level of the node 102, the unit of charge transferred from the node 102, the estimated incentive for the transferred charge, and the remaining time to transfer the charge from the node 102 to the desired charge level. The user interface 606 displays real-time or near real-time data for transfer of charge from the node 102. The charging data includes the current energy level (B_L) of the node 102, "52 kWh" of charge has been transferred by the node 102, and "15 MIN" is remaining time for completing the discharging to the desired charge level. The user interface 606 further includes a button "TERMINATE TRANSFER SESSION" for terminating the current charge transfer session. In an example, the ongoing charge transfer session may be terminated by the user by selecting the button "TERMINATE TRANSFER SESSION", before reaching the desired charge level, if required by the user.

It will be apparent to a person of ordinary skill in the art that the user interfaces 602-606 are shown for sake of brevity. However, in other embodiments, the user interfaces 602-606 may have additional or different fields and components dedicated to similar or different functionalities.

Figures 7A, 7B:
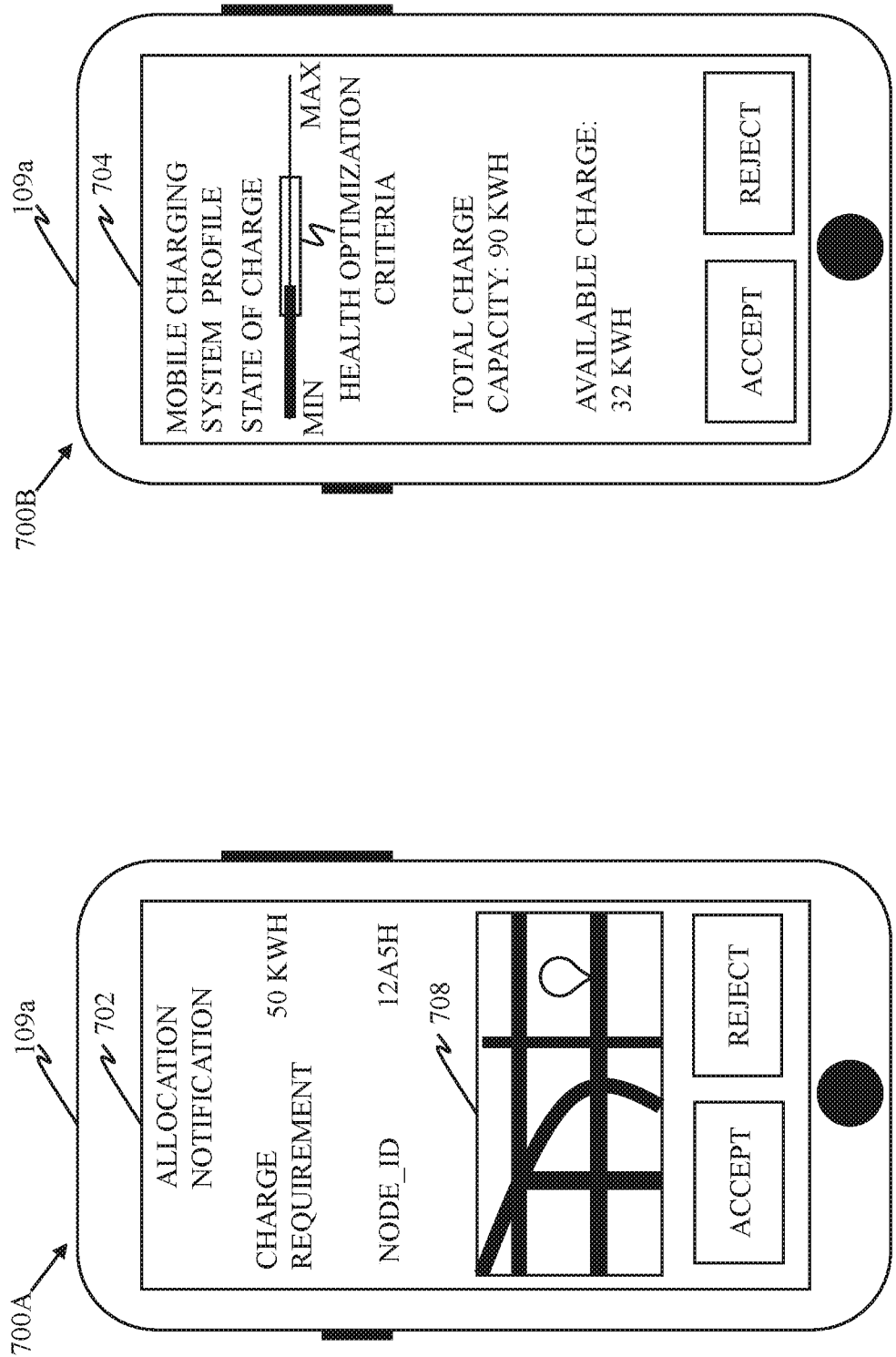
FIGS. 7A and 7B are diagrams that illustrate user interfaces rendered by the application server of FIG. 1 on a display of a driver device associated with a mobile charging system of FIG. 1, in accordance with an embodiment of the present disclosure.

FIGS. 7A and 7B are diagrams 700A and 700B that illustrate user interfaces rendered by the application server on the display of a driver device associated with a mobile charging system, in accordance with an embodiment of the disclosure. With reference to FIGS. 7A and 7B, user interfaces 702 and 704 rendered by the application server 116 on the display of the driver device 109a associated with the mobile charging system 108 are shown.

With reference to FIG. 7A, the user interface 702 is rendered on the display of the driver device 109a for displaying the allocation notification communicated by the application server 116. The user interface 702 may display determined amount of charge to be received as "50 kWh" as per the request of the node 102. The user interface 702 may further display the unique identifier "12A5H" associated with the node 102. Beneficially, the unique identifier may allow the driver of the mobile charging system 108 to identify the node 102 on reaching the second location. Further, the user interface 702 displays real-time or near real-time location and navigation or tracking information 708 for the node 102. Beneficially, such real-time or near real-time location and navigation or tracking information 708 for the node 102 allows the driver of the mobile charging system 108 to travel from the first location to the second location without getting lost or confused and wasting unnecessary time. The user interface 702 further displays two buttons "ACCEPT" and "REJECT" for accepting and rejecting the request to transfer the charge, respectively.

Further, the application server 116, after communicating the allocation notification, may be configured to provide access to the charging port of the node 102 to the mobile charging system 108. In an embodiment, the application server 116 may be configured to grant access to the charging port by communicating a password for unlocking the charging port of the node 102. The password may be communicated to the driver device 109a when the driver device 109a is detected to have reached the second location of the node 102. Further, the application server 116 may be configured to terminate the access to the charging port when transfer of charge to the mobile charging system 108 is completed.

With reference to FIG. 7B, the user interface 704 is rendered on the display of the driver device 109a to present a profile of the mobile charging system 108 to the driver of the mobile charging system 108. The user interface 704 may be used for accepting or rejecting a request for transfer of charge from the node 102. The user interface 704 may display a current state of charge and the health optimization criteria of the mobile charging system 108. Beneficially, displaying the current state of charge and the health optimization criteria allows the driver to accept or reject request for transfer of charge as per the health optimization criteria. The user interface 704 further displays the total charge capacity (for example, 90 kWh) of the mobile charging system 108 and a unit of charge (for example, 32 kWh) that is available with the mobile charging system 108.

For the sake of brevity FIGS. 7A-7B are described with respect to the mobile charging system 108. However, in different embodiments the aforementioned description is true for the mobile charging system 110. The user interfaces 702-704 are shown for sake of brevity. However, in other embodiments, the user interfaces 702-704 may have additional or different fields dedicated for similar to different functionalities.

Figure 8:
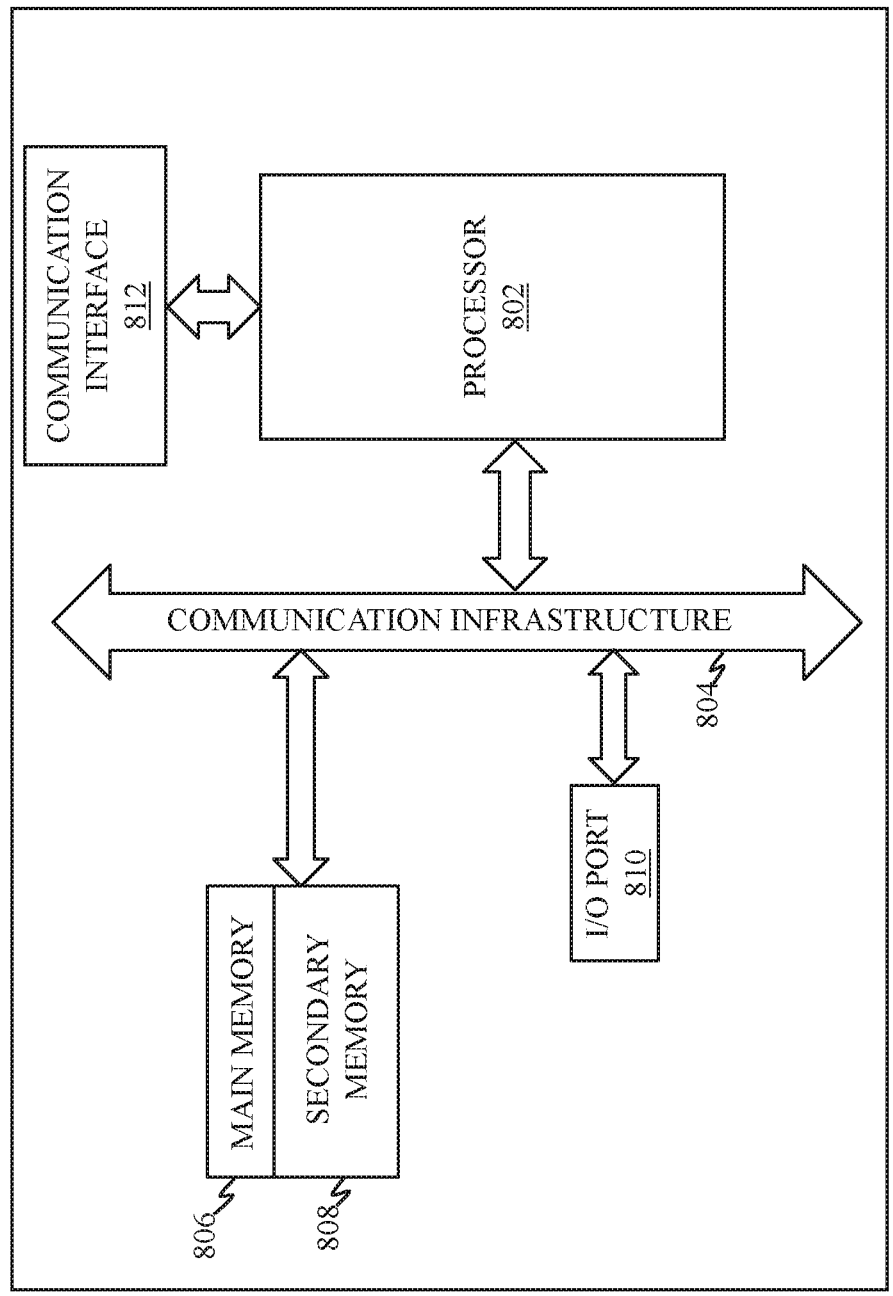
FIG. 8 is a block diagram that illustrates a system architecture of a computer system facilitating transfer of charge from a node to a mobile charging system, in accordance with an exemplary embodiment of the present disclosure.

FIG. 8 is a block diagram that illustrates a system architecture of a computer system facilitating transfer of charge from a node to a first mobile charging system, in accordance with an exemplary embodiment of the disclosure. With reference to FIG. 8, a system architecture of a computer system 800 facilitating transfer of charge from the node 102 to the first mobile charging system 108 is shown. An embodiment of the disclosure, or portions thereof, may be implemented as computer readable code on the computer system 800. In one example, the database 114 or the application server 116 of FIG. 1 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 9A-9B and 10. The computer system 800 may include a processor 802, a communication infrastructure 804, a main memory 806, and a secondary memory 808, an input/output (I/O) port 810, and a communication interface 812.

The processor 802 may be a special purpose or a general-purpose processing device. The processor 802 may be a single processor or multiple processors. The processor 802 may have one or more processor "cores." Further, the processor 802 may be coupled to the communication infrastructure 804, such as a bus, a bridge, a message queue, the communication network 118, multi-core message-passing scheme, or the like.

Examples of the main memory 806 may include RAM, ROM, and the like. The secondary memory 808 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the secondary memory 808 may be a non-transitory computer readable recording media.

The I/O port 810 may include various input and output devices that are configured to communicate with the processor 802. Examples of the input devices may include a keyboard, a mouse, a joystick, a touchscreen, a microphone, and the like. Examples of the output devices may include a display screen, a speaker, headphones, and the like. The communication interface 812 may be configured to allow data to be transferred between the computer system 800 and various devices that are communicatively coupled to the computer system 800. Examples of the communication interface 812 may include a modem, a network interface, i.e., an Ethernet card, a communication port, and the like. Data transferred via the communication interface 812 may be signals, such as electronic, electromagnetic, optical, or other signals as will be apparent to a person skilled in the art. The signals may travel via a communications channel, such as the communication network 118, which may be configured to transmit the signals to the various devices that are communicatively coupled to the computer system 800. Examples of the communication channel may include a wired, wireless, and/or optical medium such as cable, fiber optics, a phone line, a cellular phone link, a radio frequency link, and the like. The main memory 806 and the secondary memory 808 may refer to non-transitory computer readable mediums that may provide data that enables the computer system 800 to implement the methods illustrated in FIGS. 9A-9B and 10.

Figure 9A:
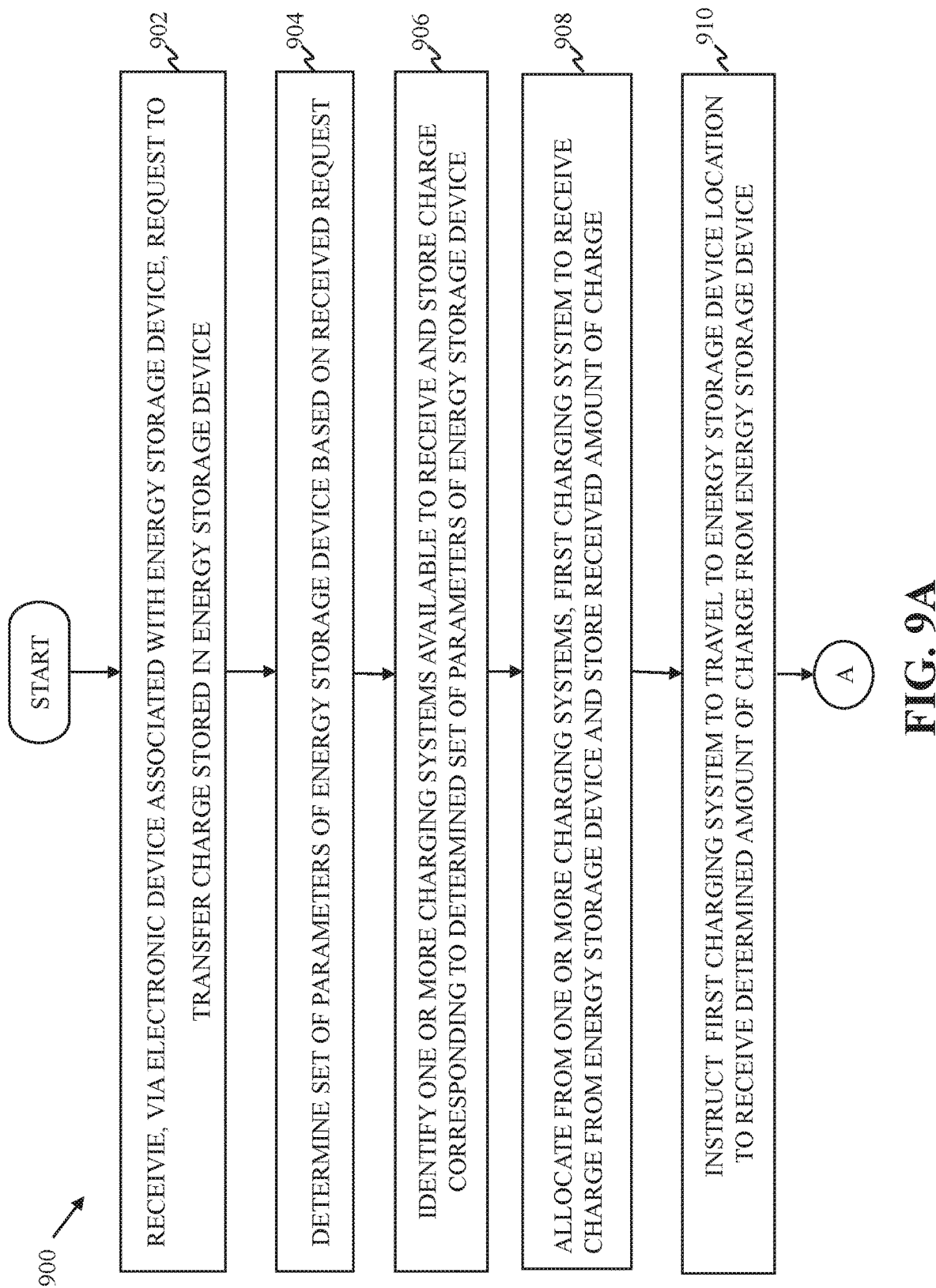

FIGS. 9A and 9B, collectively represent a flowchart that illustrates a method for facilitating transfer of charge from a node to a mobile charging system, in accordance with an exemplary embodiment of the disclosure. With reference to FIGS. 9A and 9B, a flowchart 900 is shown that illustrates a method for facilitating transfer of charge from a node to a mobile charging system.

With reference to FIG. 9A, at 902, a request to transfer charge stored in the energy storage device 103a is received, via the electronic device 105a associated with the energy storage device 103a. The application server 116 may receive the request from the electronic device 105a associated with the energy storage device 103a of the node 102. For example, the request may be sent, by the electronic device 105a, as described above with reference to FIG. 6A.

At 904, the set of parameters of the energy storage device 103a is determined based on received request. The application server 116 may determine the set of parameters of the energy storage device 103a based on the received request. For example, the determined set of parameters may include an amount of charge determined to be transferred from the energy storage device 103a and/or a charge level desired to be achieved for the energy storage device 103a. The determined set of parameters may further include a turn-around time for achieving the desired charge level of the energy storage device 103a. The desired charge level of the energy storage device 103a may be an amount of electric charge that should be maintained in the energy storage device 103a based on a preference of a user associated with the energy storage device or a state of charge of the energy storage device 103a required to maintain good health and performance of the energy storage device 103a is provided by a manufacturer of the energy storage device. While calibrating the energy storage device 103a, the desired charge level corresponds to a complete drain of charge from the energy storage device 103a.

At 906, the one or more mobile charging systems 108 and 110 available to receive and store charge corresponding to the determined set of parameters of the energy storage device 103a are identified. The application server 116 may identify the one or more mobile charging systems 108 and 110 available to receive and store the determined amount of charge corresponding to the set of parameters determined at 904.

At 908, from the one or more mobile charging systems 108 and 110, the first mobile charging system 108 is allocated to receive charge from the energy storage device 103a and store the received amount of charge. The application server 116 may allocate the first mobile charging system 108 from the one or more mobile charging systems 108 and 110 to receive charge from the energy storage device 103a and store the received charge in the charging device 111a.

At 910, the first mobile charging system 108 is instructed to travel to the location of the energy storage device 103a to receive determined amount of charge from the energy storage device 103a. The application server 116 may instruct the first mobile charging system 108 to travel to the location of the energy storage device 103a to receive the determined amount of charge from the energy storage device 103a. In some embodiments, the application server 116 may control a movement of the first mobile charging system 108, based on navigation instructions communicated to the first mobile charging system 108, to cause the first mobile charging system 108 to reach the location of the energy storage device 103a. The application server 116 may send the navigation instructions to the first mobile charging system 108. In response to receipt of the navigation instructions, the first mobile charging system 108 travels to the location of the energy storage device 103a to receive the charge from the energy storage device 103a. The location of the first mobile charging system 108 and the energy storage device 103a is obtained on the electronic devices 105a and the driver device 109a via GPS.

With reference to FIG. 9B, at 912, a charge transfer session is initiated to transfer the charge from the energy storage device 103a to the first mobile charging system 108. The application server 116 may initiate the charge transfer session to transfer the charge from the energy storage device 103a to the first mobile charging system 108.

At 914, a real-time report indicating transfer of charge from the energy storage device 103a to the first mobile charging system 108 is generated. The application server 116 may generate the real-time report to indicate the transfer of charge from the energy storage device 103a to the first mobile charging system 108. The generated real-time report may be stored in the database 114. The application server 116 may be configured to receive the real-time transfer of charge data of the energy storage device 103a from the electronic device 105a of the node 102 or from the driver device 109a and store the received real-time transfer of charge data in the database 114 or the memory 206.

At 916, the report indicating the transfer of charge is transmitted to the electronic device 105a. The application server 116 may transmit the report to the electronic device 105a to be displayed on a display screen of the electronic device 105a via the user interface 606.

At 918, a lower limit of charge storage capacity of the energy storage device 103a is calibrated based on the complete drain of charge from the energy storage device 103a. The application server 116 may calibrate the lower limit of the charge storage capacity of the energy storage device 103a. The calibration of the energy storage device 103a enables to reset an upper limit (e.g., full charged state) and the lower limit (e.g., full discharged state) values of the energy storage device 103a to keep a precise estimate of the charge storage capacity of the energy storage device 103a.

A known method to obtain a precise estimate of state of charge is to completely charge the energy storage device 103a and subsequently completely discharge the energy storage device 103a. In an embodiment, completely charging the energy storage device 103a refers to charging the energy storage device 103a to its 100 percent capacity, and completely discharging the energy storage device 103a refers to draining the charge in the energy storage device 103a to 0 percent. However, fully discharging the energy storage device 103a for calibration is not energy efficient and results in wastage of charge. The application server 116, thus, offers a solution that prevents wastage of charge during subsequent calibration attempts of the energy storage device 103a.

At 920, incentives are transmitted to the electronic device 105a in lieu of the transfer of charge. The application server 116 may incentivize the user of the node 102 for transferring extra charge from respective energy storage device 103a. The user of the electronic device 105a may be incentivized by offering a gift, a voucher, a discount coupon, reward points, or a credit note upon successful transfer of the determined amount of charge from the energy storage device 103a to the first mobile charging system 108, or the like.

Figure 10:
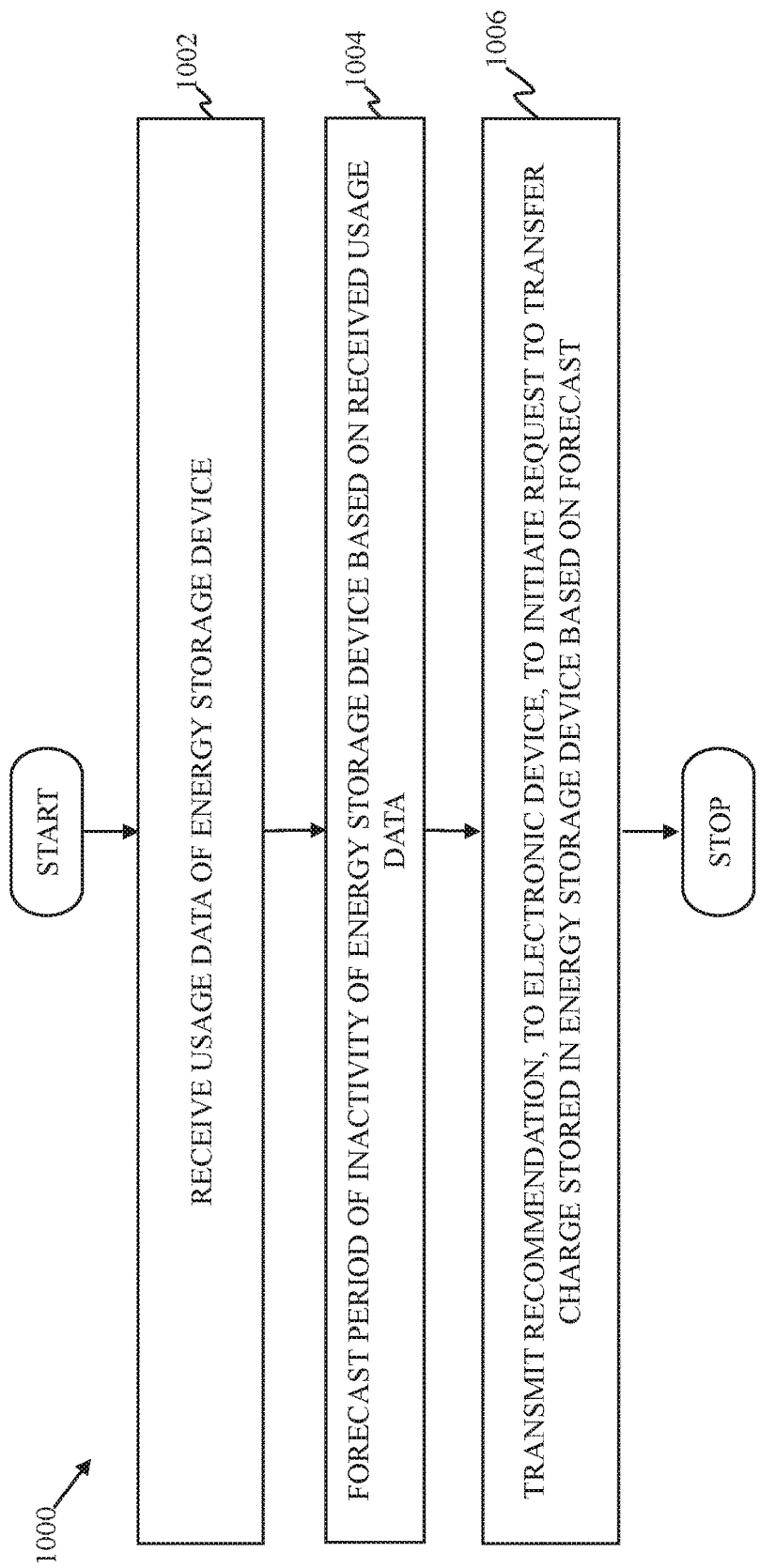
FIG. 10 is a flowchart that illustrates a method for initiating a request to transfer charge stored in the energy storage device based on a forecasted period of inactivity of the energy storage device, in accordance with an exemplary embodiment of the present disclosure.

FIG. 10 is a flowchart that illustrates a method for initiating a request to transfer charge stored in the energy storage device based on a forecasted period of inactivity of the energy storage device. With reference to FIG. 10, a flowchart 1000, that illustrates a method for initiating a request to transfer charge stored in the energy storage device 103a based on a forecasted period of inactivity of the energy storage device 103a, is shown.

At 1002, the usage data of the energy storage device 103a is received. The application server 116 may collect or receive the usage data associated with the energy storage device 103a. The data collector 204 may be further configured to store the collected usage data in the database 114 and/or the memory 206. The usage data may include the current usage data and/or the historical usage data associated with the charging of the energy storage device 103a. For example, the current usage data of the energy storage device 103a may include a current energy level of the energy storage device 103a, a current location of the node 102, and a current rate of charging or discharging of the energy storage device 103a. The historical usage data associated with the energy storage device 103a may include time of charging, a pattern associated with consumption of the charge, a time after which self-discharge action of the energy storage device 103a is initiated, time taken to complete self-discharge action after initiation, time and number of hours for which the energy storage device 103a was inactive or the like.

At 1004, a period of inactivity of the energy storage device 103a is forecasted. The application server 116 may forecast a possible period of inactivity for the energy storage device 103a. The period of inactivity may be forecasted based on the received usage data and the behavioral data collected by the application server 116. The period of inactivity may be forecasted according to the historical usage data or the past pattern of usage of the energy storage device 103a collected in the usage data.

At 1006, based on the forecasted period of inactivity of the energy storage device 103a, a recommendation is transmitted to the electronic device 105a to initiate a request to transfer charge stored in the energy storage device 103a. In an embodiment, the application server 116 may initiate the request to transfer the charge stored in the energy storage device 103a-103c.

Various embodiments of the disclosure provide the application server 116 for facilitating transfer of charge from the node 102 to the mobile charging system 108 or 110. The application server 116 may be configured to receive, via the electronic device 105a, 105b, or 105c associated with the energy storage device 103a, 103b, or 103c, a request to transfer charge stored in the energy storage device 103a, 103b, or 103c. The application server 116 may be further configured to determine the set of parameters of the energy storage device 103a, 103b, or 103c based on the received request. The set of parameters may include at least one of an amount of charge determined to be transferred from the energy storage device or a charge level desired to be achieved for the energy storage device 103a, 103b, or 103c. The application server 116 may be configured to identify the one or more mobile charging systems 108 and 110 available to receive and store charge corresponding to the set of parameters of the energy storage device 103a, 103b, or 103c. From the one or more mobile charging systems 108 and 110, the application server 116 may be configured to allocate the first mobile charging system 108 or 110 to receive charge from the energy storage device 103a, 103b, or 103c and store the received amount of charge. Subsequently, the first mobile charging system 108 or 110 travels to a location of the energy storage device 103a, 103b, or 103c to receive the determined amount of charge from the energy storage device 103a, 103b, or 103c.

Various embodiments of the disclosure provide a non-transitory computer readable medium having stored thereon, computer executable instructions, which when executed by a computer, cause the computer to execute one or more operations for facilitating transfer of charge from the node 102 to the mobile charging system 108 or 110. The one or more operations include receiving, by the application server 116, via the electronic device 105a, 105b, or 105c associated with the energy storage device 103a, 103b, or 103c, a request to transfer charge stored in the energy storage device 103a, 103b, or 103c. The one or more operations further include determining, by the application server 116, the set of parameters of the energy storage device 103a, 103b, or 103c based on the received request. The set of parameters may include at least one of an amount of charge determined to be transferred from the energy storage device or a charge level desired to be achieved for the energy storage device 103a, 103b, or 103c. The one or more operations further include identifying, by the application server 116, the one or more mobile charging systems 108 and 110 available to receive and store charge corresponding to the set of parameters of the energy storage device 103a, 103b, or 103c. The one or more operations further include allocating, by the application server 116, from the one or more mobile charging systems 108 and 110, the first mobile charging system 108 or 110 to receive charge from the energy storage device 103a, 103b, or 103c and store the received amount of charge. Subsequently, the first mobile charging system 108 or 110 travels to a location of the energy storage device 103a, 103b, or 103*c* to receive the determined amount of charge from the energy storage device 103*a*, 103*b*, or 103*c*.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the disclosure provide, among other features, systems and methods for facilitating charge transfer from a node to a mobile charging system. While various exemplary embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the scope of the disclosure, as described in the claims.

What is claimed is:

1. A method to facilitate charge transfer, the method comprising:
   receiving, by an application server, via an electronic device associated with an energy storage device, a request to transfer the charge stored in the energy storage device;
   determining, by the application server, a set of parameters of the energy storage device based on the received request, wherein the set of parameters includes at least one of an amount of charge determined to be transferred from the energy storage device or a charge level desired to be achieved for the energy storage device;
   identifying, by the application server, one or more charging systems available to receive and store the charge corresponding to the set of parameters of the energy storage device; and
   allocating, by the application server, from the one or more charging systems, a first charging system to receive the charge from the energy storage device and store the received charge, wherein the first charging system travels to a location of the energy storage device to receive the determined amount of charge from the energy storage device.

2. The method of claim 1, wherein the request is transmitted, via the electronic device, based on an input received by the electronic device from a user.

3. The method of claim 1, wherein the request is transmitted, via the electronic device, based on an input automatically transmitted by the electronic device based on one or more predetermined parameters set, for the energy storage device, by a user.

4. The method of claim 1, further comprising:
   receiving, by the application server, usage data of the energy storage device from at least one of the energy storage device or the electronic device;
   forecasting, by the application server, a period of inactivity of the energy storage device based on the received usage data; and
   transmitting, by the application server, a recommendation, to the electronic device, to initiate the request to transfer the charge stored in the energy storage device, wherein the recommendation is transmitted based on the forecasted period of inactivity being greater than a threshold inactivity period.

5. The method of claim 1, wherein the request to transfer the charge is indicative of at least one of a current charge level of the energy storage device, a maximum charge transfer rate supported by the energy storage device, and a minimum charge transfer rate supported by the energy storage device.

6. The method of claim 1, wherein the set of parameters further includes a turn-around time for achieving a desired charge level or a desired charge transfer rate of the energy storage device.

7. The method of claim 1, wherein the identified one or more mobile charging systems are available within a first geographical region of the energy storage device, and wherein a current location of each of the energy storage device and the one or more charging systems is obtained via a Global Positioning System (GPS).

8. The method of claim 1, wherein the determined amount of charge is transferred from the energy storage device to the allocated first charging system upon travel of the first charging system to the location of the energy storage device.

9. The method of claim 1, further comprising:
   transmitting, by the application server, one or more incentives to the electronic device in form of: a gift, a voucher, a discount coupon, reward points, or a credit note upon successful transfer of the determined amount of charge from the energy storage device to the first charging system.

10. The method of claim 9, further comprising:
    generating, by the application server, a real-time report of the transfer of charge from the energy storage device to the first charging system, and
    transmitting, by the application server, the report to the electronic device associated with the energy storage device for display on a display screen.

11. The method of claim 1, wherein the request to transfer the charge is received based on at least one of the energy storage device being inactive for more than a predetermined time duration, an incentivization option presented on the electronic device, a user preference to maintain a predetermined amount of charge in the energy storage device, or a health optimization criterion of the energy storage device.

12. The method of claim 1, wherein the charge level desired to be achieved for the energy storage device corresponds to a complete drain of charge from the energy storage device.

13. The method of claim 12, further comprising calibrating, by the application server, a lower limit of a charge storage capacity of the energy storage device based on the complete drain of the charge from the energy storage device.

14. A system to facilitate charge transfer, the system comprising:
an application server configured to:
receive, via an electronic device associated with an energy storage device, a request to transfer the charge stored in the energy storage device;
determine a set of parameters of the energy storage device based on the received request, wherein the set of parameters includes at least one of an amount of charge determined to be transferred from the energy storage device or a charge level desired to be achieved for the energy storage device;
identify one or more charging systems available to receive and store the charge corresponding to the set of parameters of the energy storage device; and
allocate, from the one or more charging systems, a first charging system to receive the charge from the energy storage device and store the received charge, wherein the first charging system travels to a location of the energy storage device to receive the determined amount of charge from the energy storage device.

15. The system of claim 14, wherein the set of parameters further includes a turn-around time to achieve a desired charge level and a desired charge transfer rate of the energy storage device.

16. The system of claim 14, wherein the application server is further configured to:
generate a real-time report of the transfer of charge from the energy storage device to the first charging system, and
transmit the report to the electronic device associated with the energy storage device for display on a display screen.

17. The system of claim 14, wherein the request to transfer the charge is received based on at least one of the energy storage device being inactive for more than a predetermined time duration, an incentivization option presented on the electronic device, a user preference to maintain a predetermined amount of charge in the energy storage device, or a health optimization criterion of the energy storage device.

18. The system of claim 14, wherein the application server is further configured to:
receive usage data of the energy storage device from at least one of the energy storage device or the electronic device;
forecast a period of inactivity of the energy storage device based on the received usage data; and
transmit a recommendation, to the electronic device, to initiate the request to transfer the charge stored in the energy storage device, wherein the recommendation is transmitted based on the forecasted period of inactivity being greater than a threshold inactivity period.

19. The system of claim 14, wherein the charge level desired to be achieved for the energy storage device corresponds to a complete drain of charge from the energy storage device.

20. The system of claim 19, wherein the application server is further configured to calibrate a lower limit of a charge storage capacity of the energy storage device based on the complete drain of the charge from the energy storage device.

* * * * *